US011570732B2

(12) United States Patent
Perez-Ramirez et al.

(10) Patent No.: US 11,570,732 B2
(45) Date of Patent: Jan. 31, 2023

(54) METHODS TO MITIGATE DENIAL OF SERVICE ATTACKS ON TIME SYNCHRONIZATION USING LINK REDUNDANCY FOR INDUSTRIAL/AUTONOMOUS SYSTEMS

(71) Applicant: Intel Corporation, Santa Clara, CA (US)

(72) Inventors: Javier Perez-Ramirez, North Plains, OR (US); Mikhail Galeev, Beaverton, OR (US); Susruth Sudhakaran, Beaverton, OR (US); Dave Cavalcanti, Portland, OR (US); Manoj R Sastry, Portland, OR (US); Christopher N Gutierrez, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 17/032,921

(22) Filed: Sep. 25, 2020

(65) Prior Publication Data

US 2021/0014806 A1 Jan. 14, 2021

(51) Int. Cl.
*H04W 56/00* (2009.01)
*G06F 1/12* (2006.01)
*H04L 9/40* (2022.01)
*H04W 12/122* (2021.01)

(52) U.S. Cl.
CPC ............ *H04W 56/001* (2013.01); *G06F 1/12* (2013.01); *H04L 63/1458* (2013.01); *H04W 12/122* (2021.01)

(58) Field of Classification Search
CPC ..... H04W 56/001; H04W 12/122; G06F 1/12; H04L 63/1458
See application file for complete search history.

(56) References Cited

U.S. PATENT DOCUMENTS

| 10,158,444 | B1 * | 12/2018 | Darras | ................. H04J 3/0667 |
| 10,938,475 | B1 * | 3/2021 | Loprieno | ................ H04J 14/02 |
| 11,089,386 | B1 * | 8/2021 | Bernstein | .......... H04N 21/8547 |

(Continued)

FOREIGN PATENT DOCUMENTS

| WO | 2016184981 A2 | 11/2016 |
| WO | 2020069182 A1 | 4/2020 |

OTHER PUBLICATIONS

European Search Report for European Application No. 21183192, dated Jan. 4, 2022, 5 pages.

(Continued)

*Primary Examiner* — Walter J Divito
*Assistant Examiner* — Anthony Luo
(74) *Attorney, Agent, or Firm* — KDB Firm PLLC

(57) ABSTRACT

Systems and methods in which devices synchronize their clocks for purposes of data transmission are described. Particularly, the disclosed systems and methods provide detection and mitigation of interference by malicious (or non-malicious) wireless devices with communication of time synchronized data over wireless networks. Systems and methods are provided where times statistics related to multiple instances of wireless time synchronization are collected and collated. Devices in the system can discipline their internal clocks based on the collated time statistics.

25 Claims, 14 Drawing Sheets

(56) References Cited

U.S. PATENT DOCUMENTS

| | | | | |
|---|---|---|---|---|
| 2005/0107039 | A1* | 5/2005 | Lindoff | H04B 17/20 455/63.1 |
| 2016/0165557 | A1* | 6/2016 | Alexander | H04W 56/001 370/350 |
| 2017/0302392 | A1* | 10/2017 | Farra | H04W 56/0045 |
| 2018/0292522 | A1 | 10/2018 | Cavendish et al. | |
| 2019/0104055 | A1* | 4/2019 | Craciunas | H04L 47/24 |

OTHER PUBLICATIONS

Cavalcanti et al., "Avnu Alliance—White Paper—Wireless TSN—Definitions, Use Cases & Standards Roadmap" Version #1.0—Mar. 4, 2020.

Cavalcanti et al., "Extending Accurate Time Distribution and Timeliness Capabilities Over the Air to Enable Future Wireless Industrial Automation Systems" Proceedings of the IEE - vol. 107, No. 6, Jun. 2019.

Kim et al., "Demo/Poster Abstract: Enabling Time-Critical Applications over Next-Generation 802.11 Networks" 2018 IEEE Conference on Computer Communications Poster and Demo.

* cited by examiner

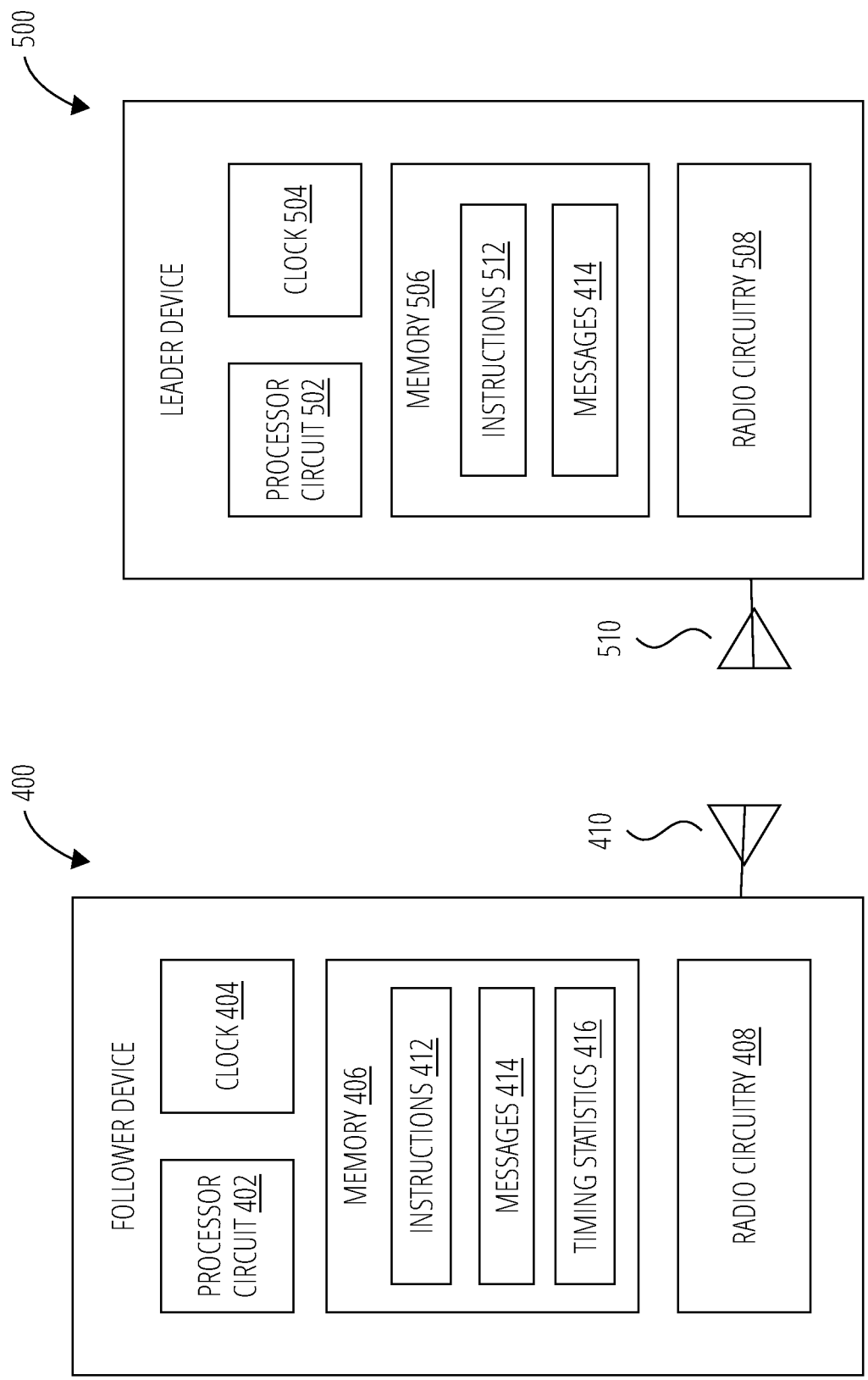

US 11,570,732 B2

METHODS TO MITIGATE DENIAL OF SERVICE ATTACKS ON TIME SYNCHRONIZATION USING LINK REDUNDANCY FOR INDUSTRIAL/AUTONOMOUS SYSTEMS

BACKGROUND

Numerous modern systems, such as, autonomous driving systems and industrial systems rely on wireless communication to facilitate operation of the system. Thus, this wireless communication between devices in the systems must be highly reliable. In particular, the wireless communication scheme is often employed to communicate time sensitive information with low latency, low error, and high throughput. As new wireless schemes are developed and deployed attack vectors are often introduced which malicious parties can interfere with operation of the systems employing the wireless communication scheme.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates a follower device 400.
FIG. 5 illustrates a leader device 500.
FIG. 8A illustrates a time synchronization sequence 800a.

DETAILED DESCRIPTION

The present disclosure is generally directed to reducing interference or attack vectors for wireless time synchronization systems. For example, devices in a system participating in real-time, or said differently, time-sensitive, communication need to have a common understanding of time. A common representation and alignment of time between devices in a system is often referred to as time-sensitive networking (TSN). Various standards have been developed to address time-sensitive communications. For example, the Institute of Electrical and Electronics Engineers (IEEE) has promulgated various wireless standards, which have been extended to address TSN, such as, IEEE 802.1AS and IEEE 802.1Qbv which provide various methods for synchronizing device clocks.

Often, the wireless communication discussed herein operates over Wi-Fi. Although the present disclosure often uses Wi-Fi as an example, the systems and techniques described herein to mitigate attacks on time synchronization capabilities are not limited to just Wi-Fi. Furthermore, the concepts of TSN and mitigation of attack vectors for TSN described herein may be applied to wired TSN systems as opposed to the wireless TSN systems described herein.

Various examples described herein can be implemented to address situations where a malicious party attempts to "jam" wireless transmissions dedicated to enabling time synchronization over wireless, which could prevent device wirelessly connected to a leader clock to discipline their device clocks. In other examples, the present disclosure can be applied to mitigate against interference from adjacent devices, which may still cause disruptions in time synchronization between devices in a system communicating over a network. Additionally, the present disclosure can be applied to improve the performance and reliability of wireless time synchronization over multiple wireless links using dynamic channel probing.

Figure 1:
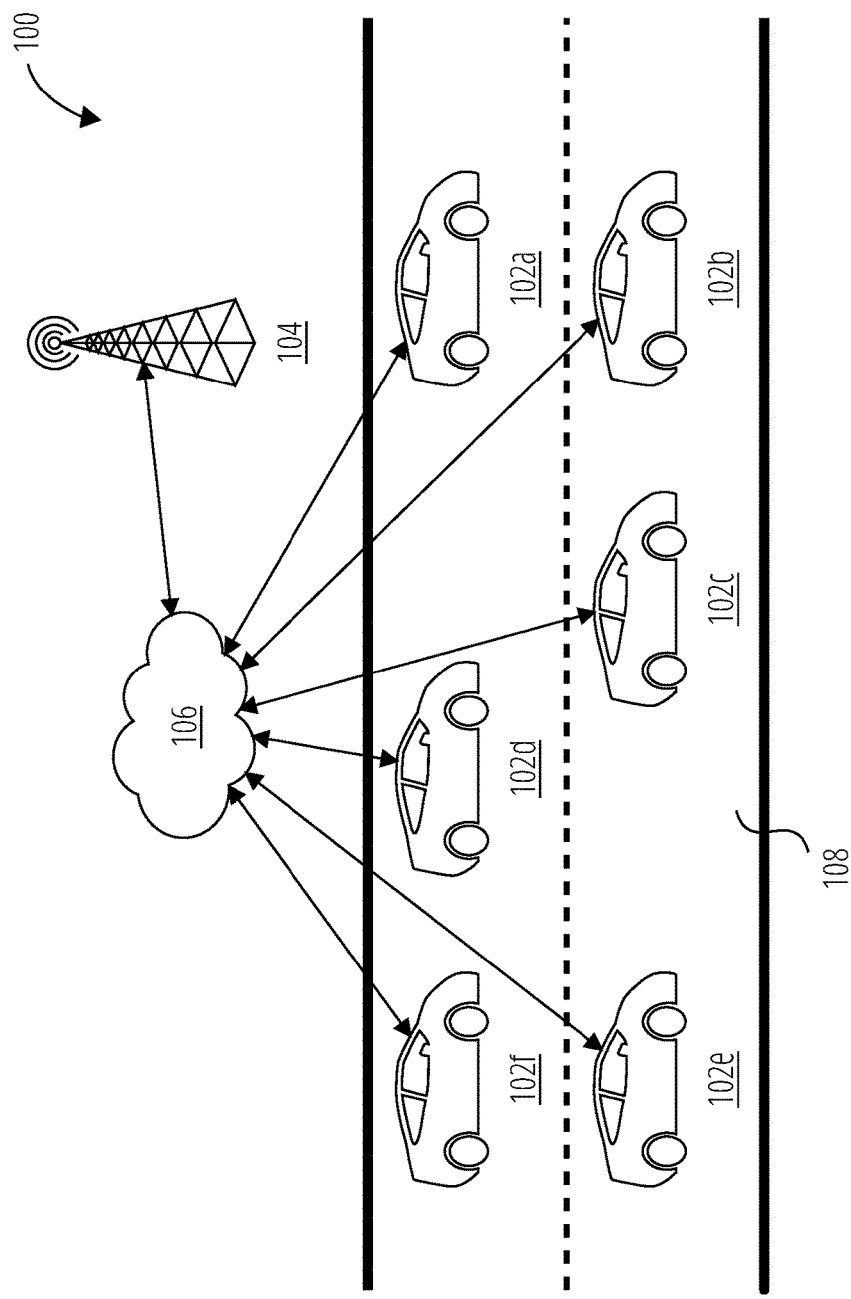
FIG. 1 illustrates a system 100.
Figure 2:
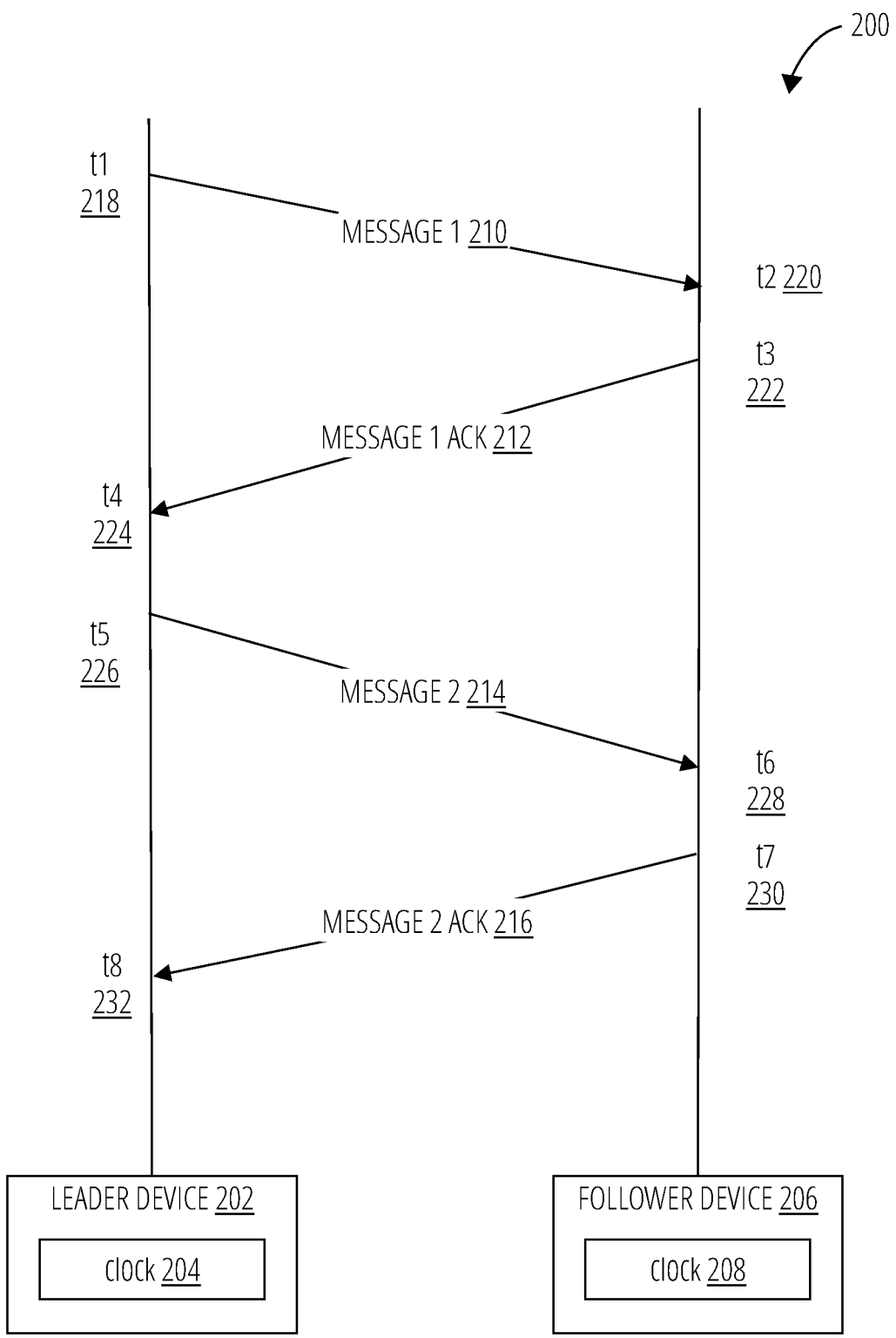
FIG. 2 illustrates a technique 200.

As a specific example, the present disclosure can be applied to detect and mitigate interference that malicious and non-malicious devices might cause in a wireless network synchronized using 802.1AS over 802.11 to reduce negative impacts on the time synchronization. The present disclosure focuses on attacks designed to be inconspicuous, which cause wireless devices synchronized using such methods (e.g., 802.1AS-based time synchronization) to have inconsistent performance over time (e.g., high jitter in wireless clock synchronization accuracy, or the like). An example attack is described with reference to FIG. 3. Prior to this however, an example system in which devices may synchronize their clocks and in which the detection and mitigation techniques of the present disclosure may be implemented is described with respect to FIG. 1. Further, an example time synchronization technique is described with reference to FIG. 2. It is noted, the system and technique described with reference to FIG. 1 and FIG. 2 are given for illustration and understanding only and not to be limiting. In particular, the detection and mitigation techniques disclosed herein can be applied to systems different from the system of FIG. 1 and to systems employing a different time synchronization technique than described by FIG. 2.

FIG. 1 illustrates a system 100 including a number of connected vehicles, such as vehicle 102a, vehicle 102b, vehicle 102c, vehicle 102d, vehicle 102e, and vehicle 102f. Vehicle 102a to vehicle 102f are depicted traveling on a roadway 108 with a roadside unit (RSU) 104 adjacent to the roadway 108. Although these figures illustrate the RSU 104 being arranged at a side of the roadway 108, it may be understood that the RSU 104 may be arranged anywhere (e.g., top, bottom, etc.) near the roadway 108 or in any fashion that allows the RSU 104 to communicate with the vehicles (and vice versa). RSU 104 may be mobile (e.g., one of vehicles, or the like) and travel on roadway 108 with the vehicles. Moreover, it may be understood that vehicles 102a to vehicle 102f may not be limited to motor-based vehicles (e.g., gas, diesel, electric), but may be any suitable vehicle configured to perform vehicle-to-vehicle (V2V) and/or vehicle-to-anything (V2X) communication, such as railed vehicles (e.g., trains, trams), watercraft (e.g., ships, boats), aircraft (airplanes, spaceships, satellites, etc.) and the like.

Vehicle 102a to vehicle 102f and RSU 104 can communicate with each other over network 106. In general, communication between devices (e.g., vehicle 102a to vehicle 102f and RSU 104, or the like) can be facilitated by RSU 104 acting as a routing node for network 106. For example, RSU 104 can provide network 106 to facilitate a Wi-Fi communication scheme. Said differently, vehicle 102a to vehicle 102f and RSU 104 can be arranged to communicate in compliance with one or more standards, and for example, send messages via network 106 where network 106 operates based on one or more standards. For example, the communication schemes of the present disclosure, may be based on one or more communication standards, such as, for example, one of the 802.1 or 802.11 standards promulgated by the Institute of Electrical and Electronic Engineers (IEEE), cellular and long-term evolution (LTE) standards promulgated by the 3$^{rd}$ Generation Partnership Project (3GPP). Additionally, the messages communicated via network 106 may be based on one or more standards, such as, SAE J2735, which defines BSM, among other messages.

During operation, vehicle 102*a* to vehicle 102*f* and/or RSU 104 can be arranged to transmit (e.g., via network 106, or the like) information elements comprising indications of data related to travel on roadway 108 (e.g., vehicle platoon information, autonomous vehicle information roadway safety information, etc.). As a specific example, vehicle 102*b* can transmit a message via network 106 including indications of data (e.g., speed of vehicle 102*b*, trajectory of vehicle 102*b*, position of vehicle 102*b*, acceleration of vehicle 102*b*, etc.). Other ones of the vehicles (e.g., vehicle 102*a*, vehicle 102*c*, etc.) or RSU 104 can receive the message transmitted by vehicle 102*b* via network 106. As another example, the devices (e.g., RSU 104, vehicle 102*a*, etc.) can be arranged to send and receive basic safety messages (BSM), cooperative awareness messages (CAM), decentralized environmental notification messages (DENM), or the like via network 106.

It is to be appreciated that some such messages will be time-sensitive. For example, safety related messages are time sensitive. As another example, messages related to group vehicular travel (e.g., platoons, or the like) are time sensitive. To facilitate such time-sensitive communication, the devices of system 100 (e.g., vehicle 102*a*, vehicle 102*b*, etc.) and RSU 104 can synchronize to a single leader clock. Although devices of system 100 are not depicted with clocks, it is to be appreciated that the circuitry (e.g., processing circuitry, memory storage circuitry, etc.) will often operate based on a clock. Furthermore, actual circuitry, hardware, or device components as may be provided in ones of the devices of system 100 are depicted in later figures of this disclosure (e.g., FIG. 13, FIG. 14, etc.).

FIG. 2 describes a technique 200 for synchronizing clocks. It is noted that the present disclosure can be applied to mitigate or reduce possibility of attack against such clock synchronization techniques as described by technique 200. Technique 200 depicts operations for synchronizing clocks between devices in a systems (e.g., system 100, or the like). For example, a leader device 202 and a follower device 206 can synchronize their clocks. Said differently, follower device 206 can synchronize clock 208 from leader device 202 and clock 204. Technique 200 includes an operation 210 where leader device 202 sends a message (e.g., action frame M1, or the like) to follower device 206 at time 1 218 and follower device 206 receives the message at time 2 220. In particular, leader device 202 sends the message to follower device 206 with a time stamp indicating time 1 218. Further, the follower device 206 time stamps the message upon arrival with time 2 220.

Technique 200 continues with an operation 212 where follower device 206 sends an message acknowledgment (e.g., action frame M1 ACK, or the like) to leader device 202 at time 3 222 and leader device 202 receives the message acknowledgment at time 4 224. In particular, follower device 206 sends the message acknowledgement to leader device 202 with a time stamp indicating time 3 222. Further, the leader device 202 time stamps the message acknowledgement upon arrival with time 4 224.

Technique 200 continues with operation 214 and operation 216 where another message (e.g., action frame) is sent from the leader device 202 to follower device 206 and a message acknowledgement is sent from follower device 206 to leader device 202. In particular, leader device 202 sends a second message (e.g., action frame M2, or the like) to follower device 206 at time 5 226 and follower device 206 receives the message at time 6 228. In particular, leader device 202 sends the message to follower device 206 with a time stamp indicating time 1 218 as well as the difference between time 1 218 and time 4 224. Further, the follower device 206 time stamps the message upon arrival with time 6 228.

Furthermore, at operation 216, follower device 206 sends the message acknowledgement to leader device 202 with a time stamp indicating time 7 230. Further, the leader device 202 time stamps the message acknowledgement upon arrival with time 8 232. Follower device 206 can compute a clock offset for use in synchronizing clock 208 to clock 204 from time 1 218 and the difference between time 1 218 and time 4 224.

Figure 3:
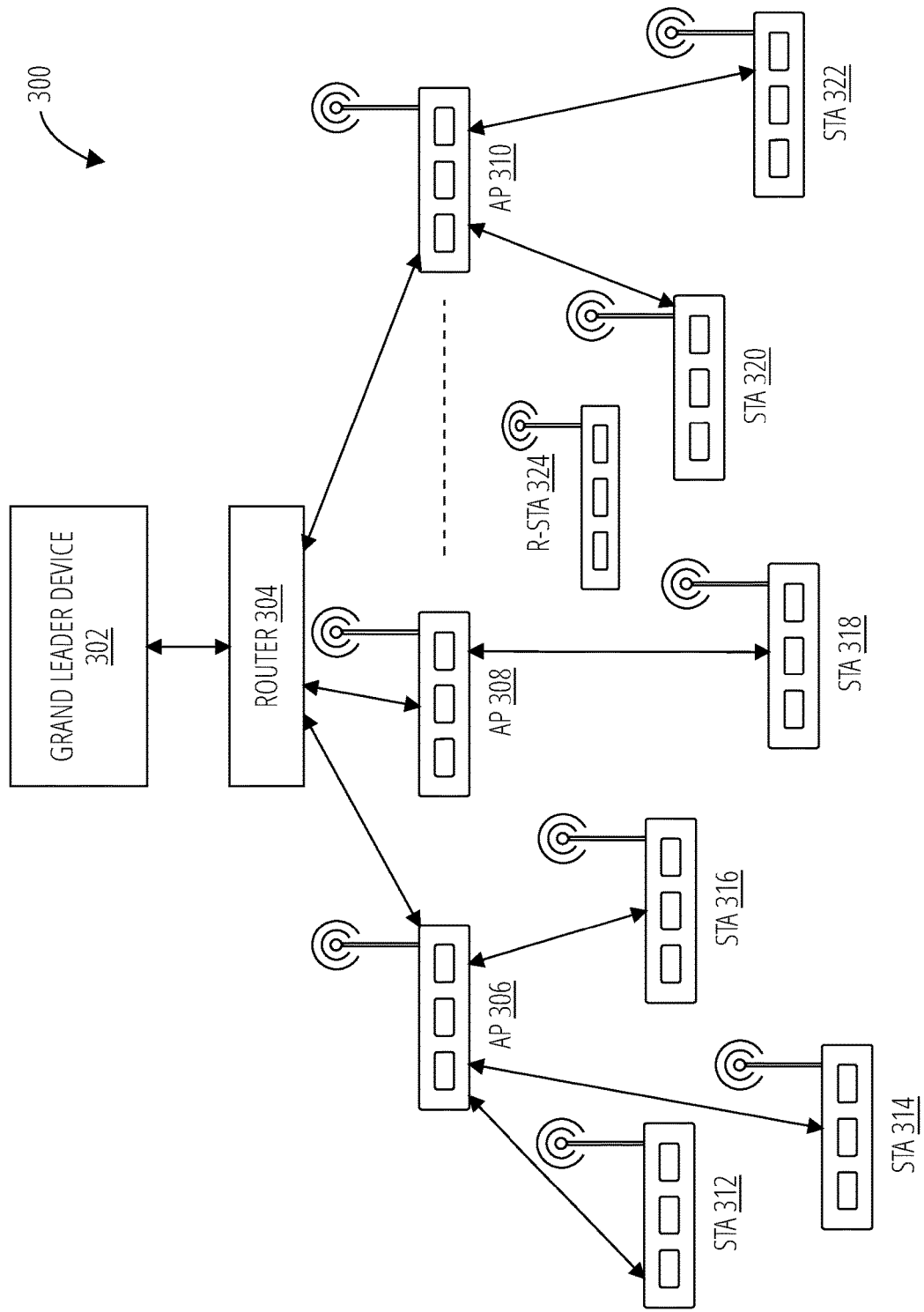
FIG. 3 illustrates an environment 300.

FIG. 3 illustrates an environment 300 in which an attack against time synchronization can take place. Environment 300 depicts a grand leader device 302 coupled to a number of access points, such as access point (AP) 306, AP 308, and AP 310, via router 304. Further, environment 300 depicts stations wirelessly via access points. In particular, environment 300 depicts station (STA) 312, STA 314, and STA 316 coupled to AP 306; STA 318 coupled to AP 308; and STA 320 and STA 322 coupled to AP 310.

Environment 300 can be deployed in any of a variety of settings (e.g., industrial, warehousing, retail, autonomous vehicles, or the like). As depicted, the access points are coupled to grand leader device 302 via a wired connection (e.g., Ethernet, or the like). As such, these follower devices (e.g., AP 306, AP 308, and AP 310, or the like) can be synchronized to the grand leader device 302 using 802.1AS over wire. Said differently, clocks of AP 306, AP 308, and AP 310 can be synchronized to the clock of grand leader device 302 via 802.1AS over a wired connection (e.g., Ethernet, or the like).

Additionally, follower stations (e.g., STA 312, STA 314, STA 316, STA 318, STA 320, and STA 322, or the like) can be synchronized to grand leader device 302 through the access points using 802.1AS over wireless. Said differently, clocks of STA 312, STA 314, STA 316, STA 318, STA 320, and STA 322 can be synchronized to the clock of grand leader device 302 via 802.1AS over a wireless connection (e.g., 802.11, or the like).

Environment 300 further depicts a rouge device, or rouge station (R-STA) 324, deployed in the environment. R-STA 324 could be a physical device, or a software define radio. R-STA 324 coupled be arranged to identify the 802.1AS packet exchange (e.g., as described in FIG. 2) with no need of any deep packet inspection and interfere and jam when message acknowledgements from the followers are sent. Without receiving the acknowledgment form the followers (e.g., one of the stations, or the like) the leader device (e.g., grand leader device 302) would consider the original message to be lost and would re-initiate a new exchange with the follower device to enable synchronization.

As such, disruptions in time synchronization may be introduced into the network depicted in environment 300, which may have negative impacts on the operations of devices (e.g., stations, or the like) in the environment 300. For example, deterministic data delivery schemes, such as 802.1Qbv time-aware scheduling, can be disrupted. This is in addition to the latency and performance degradation that would be introduced from such an attack as described with reference to FIG. 3.

The present disclosure provides a number of examples for detecting and mitigating attacks on time synchronization of wireless devices as described here. Although the balance of the description focuses on wireless examples, the disclosure can be applied to hybrid wired and wireless networks (e.g., the network depicted in FIG. 3).

FIG. 4 and FIG. 5 depict a follower device 400 and leader device 500, respectively. The follower device 400 of FIG. 4 could be one of the vehicles of system 100 of FIG. 1 (e.g., vehicle 102a, or the like). As another example, follower device 400 could be one of the stations of FIG. 3 (e.g., STA 312, or the like). Follower device 400 includes a processor circuit 402, a clock 404, memory 406, radio circuitry 408, and an antenna 410. Memory stores instructions 412, messages 414, and timing statistics 416. During operation, processor circuit 402 can execute instructions to cause follower device 400 to receive messages 414 from a leader device (e.g., leader device 500, or the like) via radio circuitry 408 and antenna 410. More details regarding the message reception scheme are described below. However, in general, processor circuit 402 can execute instructions 412 to cause follower device 400 to receive message wireless over a network (e.g., network 106, or the like). The messages 414 will include an indication of time stamps and/or time differentials used for disciplining the clock 404.

The leader device 500 of FIG. 5 could be one of the vehicles of system 100 of FIG. 1 (e.g., vehicle 102a, or the like) or the RSU 104. As another example, leader device 500 could be the grand leader device 302 of FIG. 3. In general, however, leader device 500 will be the device in a system with which the other devices are to discipline (or synchronize) their clocks. As depicted in FIG. 5, leader device 500 includes processor circuit 502, clock 504, memory 506, radio circuitry 508, and antenna 510. Memory 506 stores instructions 512 and messages 414. During operation, processor circuit 502 can execute instructions 512 to cause leader device 500 to generate messages 414 and transmit messages 414 to a follower device (e.g., follower device 400, or the like) via radio circuitry 508 and antenna 510.

Figure 6:
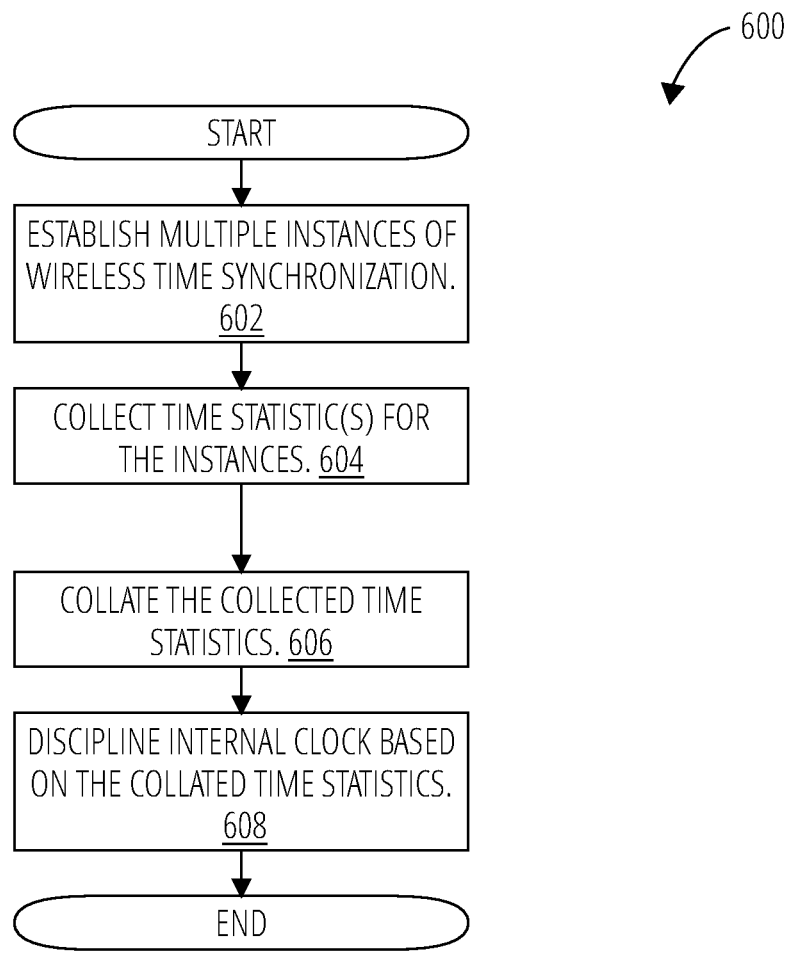
FIG. 6 illustrates a logic flow 600.

FIG. 6 illustrates a logic flow 600 that can be implemented by a client device (e.g., vehicle 102a, follower device 206, STA 312, or the like) to mitigate disruptions to timing synchronization as described herein. Logic flow 600 can begin at block 602 "establish multiple instances of wireless time synchronization." At block 602, circuitry at a client device can establish multiple instances of wireless time synchronization. For example, in executing instructions 412 processor circuit 402 can establish multiple instances of wireless time synchronization with a leader device. In some example, the client device (e.g., follower device 400, or the like) can send a request to initiate wireless time synchronization to a leader device (e.g., leader device 500, or the like).

In general, at block 602, processor circuit 402 can execute instructions 412 to cause follower device 400 to connect to the leader over multiple channels of a wireless connection. For example, processor circuit 402 can execute instructions 412 to request initiation of a time synchronization session (e.g., an 802.1AS session, or the like) with a leader on a first channel of a wireless connection. Additionally, processor circuit 402 can execute instructions 412 to request initiation of a time synchronization session (e.g., an 802.1AS session, or the like) with a leader on a second channel of a wireless connection.

Continuing to block 604 "collect time statistic(s) for the instances" circuitry of the client device can collect time statistic(s) for the instances. For example, processor circuit 402 can execute instructions 412 to implement the packet exchange technique 700 depicted in FIG. 7 for the instances of wireless time synchronization established at block 602. As will be appreciated from the description of FIG. 7 below, the packet exchange technique 700 provides that messages (e.g., messages 414, or the like) can be sent by a leader device and received by a follower device. The messages include indications of time stamps as described in greater details elsewhere herein.

At block 604, processor circuit 402 can further execute instructions 412 to collect the time stamps from the messages to form time statistics (e.g., timing statistics 416, or the like). For example, processor circuit 402 can execute instructions 412 to collect the time stamps (e.g., time 1 716, time 5 734 less time 1 716, etc) for each instance of time synchronization (e.g., each channel of a wireless connection, or the like).

Continuing to block 606 "collate the collected time statistics" processing circuitry can collate the collected time statistics. For example, processor circuit 402 can execute instructions 412 to collate the time statistics collected at block 604 from the instances of time synchronization. As a specific example, processor circuit 402 can execute instructions 412 to derive the mean of the clock drift $\overline{\tau d},i$ over a time window (e.g., which can be selected by a user, preprogrammed into instructions 412, or the like) corresponding to the i-th time synchronization instance (e.g., time statistics from the i-th wireless channel, or the like).

Continuing to block 608 "discipline internal clock based on the collated time statistics" processing circuitry can discipline a clock (e.g., internal clock to the follower device 400, or the like) based on the time statistics collated at block 606. As a specific example, processor circuit 402 can execute instructions 412 to discipline clock 404 based on the lowest of the derived clock drifts (e.g., $\overline{\tau d},i$).

Figure 7:
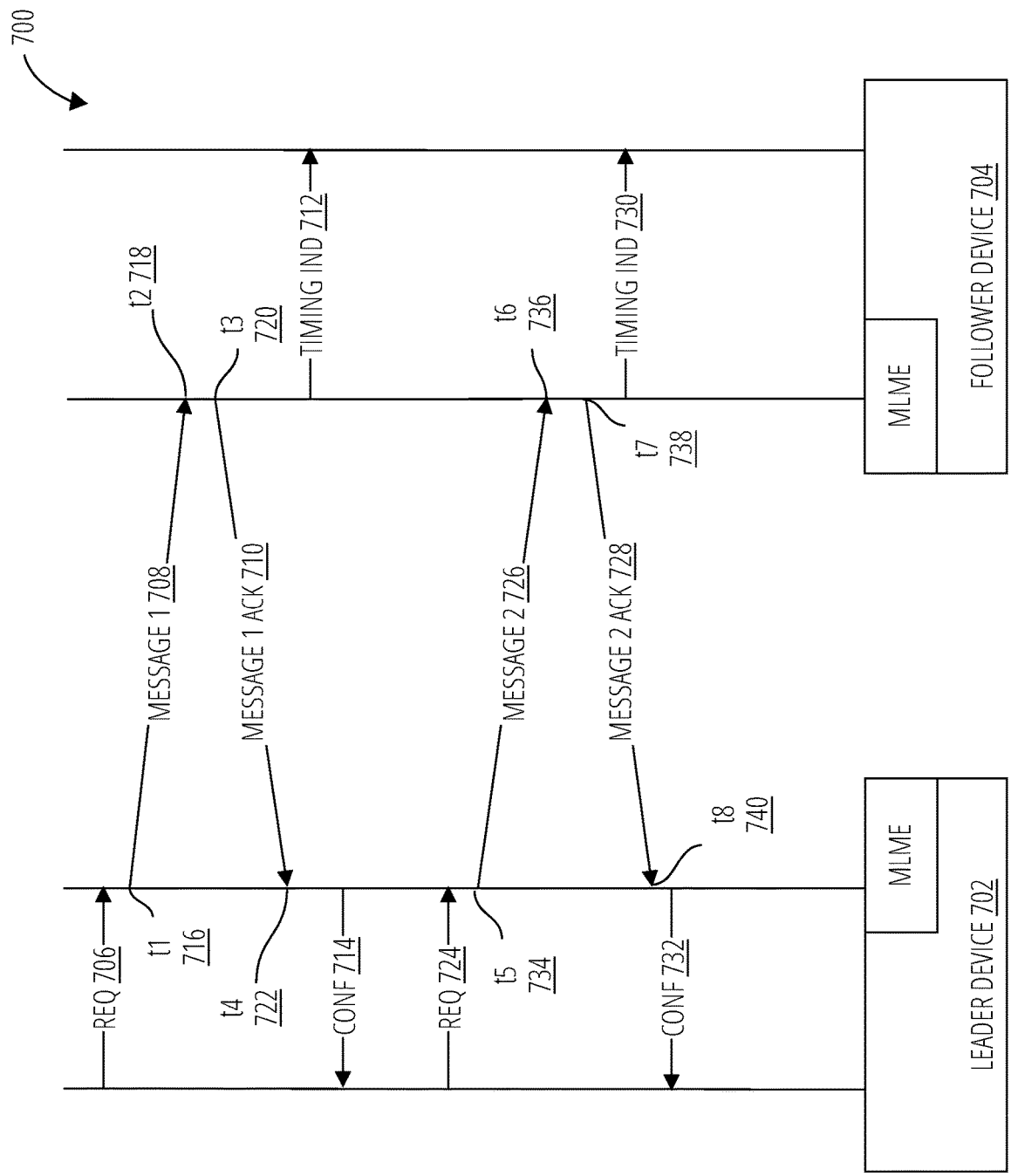
FIG. 7 illustrates a packet exchange technique 700.

FIG. 7 describes packet exchange technique 700 for synchronizing clocks. The packet exchange technique 700 depicted in FIG. 7 can be associated with messages exchanged as part of an instance of time synchronization initiated by a follower device (e.g., follower device 704, or the like). Once initiated by follower device 704, leader device 702 indicated the start of message exchange at operation 706 by issuing a medium access control (MAC) layer management entity (MLME) request message. Packet exchange technique 700 includes operation 708 where leader device 702, responsive to the MLME request, sends a message (e.g., action frame M1, or the like) to follower device 704 at time 1 716 and follower device 704 receives the message at time 2 718. In particular, leader device 702 sends the message to follower device 704 with a time stamp indicating time 1 716. Further, the follower device 704 time stamps the message upon arrival with time 2 718.

Packet exchange technique 700 continues with operation 710 where follower device 704 sends an message acknowledgment (e.g., action frame M1 ACK, or the like) to leader device 702 at time 3 720 and leader device 702 receives the message acknowledgment at time 4 722. In particular, follower device 704 sends the message acknowledgement to leader device 702 with a time stamp indicating time 3 720. Further, the leader device 702 time stamps the message acknowledgement upon arrival with time 4 722.

Packet exchange technique 700 further includes operation 712 where the MLME of follower device 704 sends an indication of the timing (e.g., indication of time 1 716, or the like) along to the processing circuitry of the follower device 704. Additionally, packet exchange technique 700 includes operation 714 where MLME of the leader device 702 sends, responsive to receiving the message acknowledgment at operation 710, a confirmation to the processing circuitry of the leader device 702.

Packet exchange technique 700 continues with operation 724 where another MLME request is made by the leader device 702. Responsive to the MLME request, packet exchange technique 700 includes operation 726 and operation 728 where leader device 702 can send another message (e.g., action frame) to follower device 704 and a message acknowledgement can be sent from follower device 704 to leader device 702. In particular, leader device 702 sends a second message (e.g., action frame M2, or the like) to follower device 704 at time 5 734 and follower device 704 receives the message at time 6 736. In particular, leader device 702 sends the message to follower device 704 with a time stamp indicating time 5 734 as well as the difference between time 1 716 and time 4 722. Further, the follower device 704 time stamps the message upon arrival with time 6 228.

Furthermore, at operation 728, follower device 704 sends the message acknowledgement to leader device 702 with a time stamp indicating time 7 230. Further, the leader device 702 time stamps the message acknowledgement upon arrival with time 8 232.

Figure 8A:
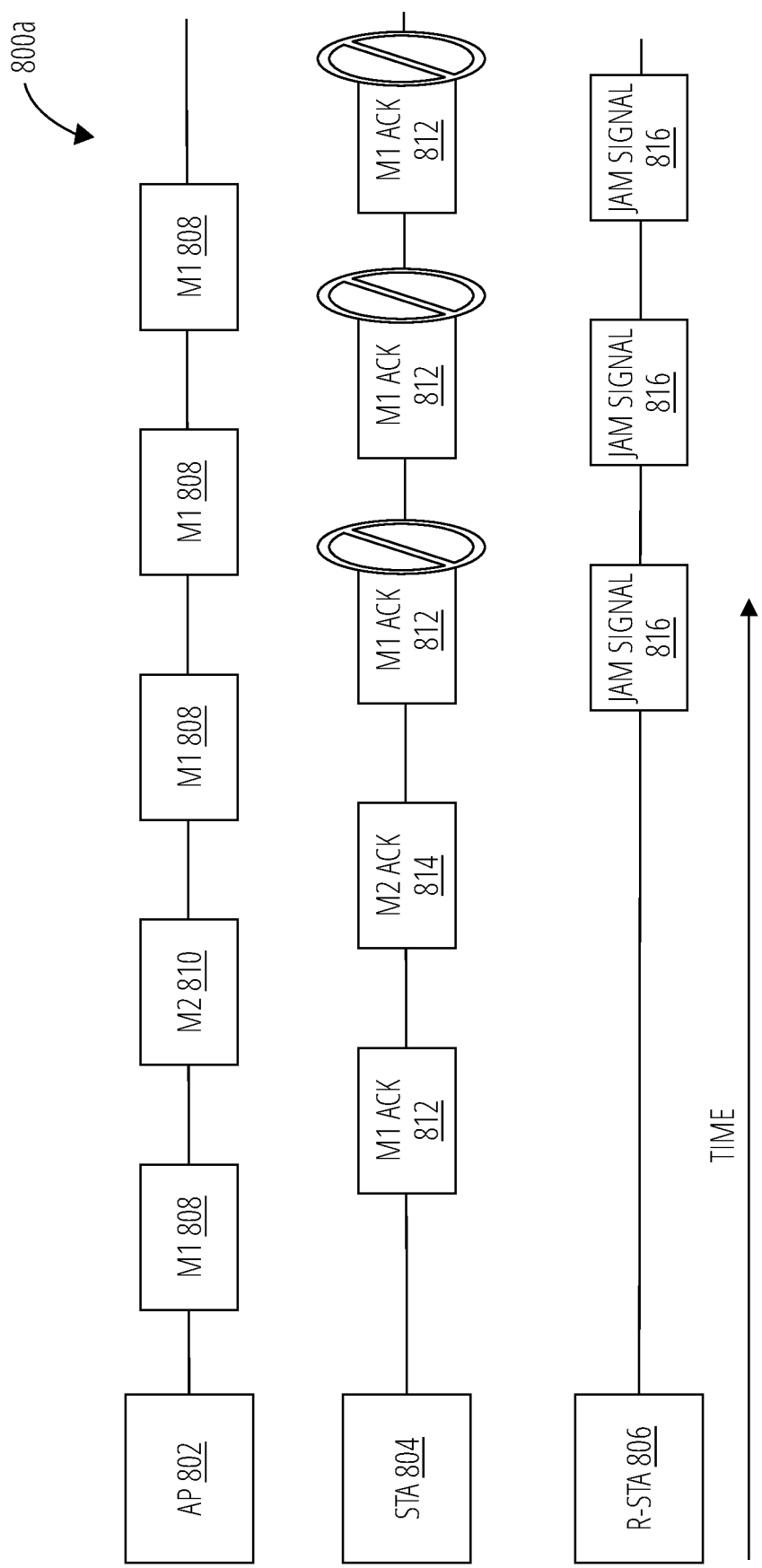

FIG. 8A, FIG. 8B, FIG. 9 and FIG. 10 illustrate time synchronization sequences where packets are exchanged between leader and follower devices. In each of these figures, the techniques are described by depicting packets exchanged along an X axis, where the X axis represents time. FIG. 8A details a time synchronization sequence 800a that illustrates interference that may be caused by a rouge station (e.g., rouge station (R-STA) 324). As noted above, rouge stations can be malicious or non-malicious but still interfere with message exchange. Time synchronization sequence 800a details an AP 802, an STA 804, and an R-STA 806 deployed in an environment (e.g., system 100, environment 300, or the like). In this example, AP 802 is the leader device (or relaying time synchronization details for the leader device) while the STA 804 is the follower device. During operation, and particularly, to initiate time synchronization, messages and message acknowledgement frames are exchanged between the AP 802 and the STA 804. For example, time synchronization sequence 800a depicts message 1 808 and message 2 810 being transmitted by AP 802. Likewise message 1 acknowledgment 812 and message 2 acknowledgment 814 are depicted being transmitted by STA 804. However, in addition, time synchronization sequence 800a depicts R-STA 806 selectively jamming the wireless transmission of the message acknowledgement frames (e.g., message 1 acknowledgment 812).

Due to the R-STA 806 jamming ones of the message 2 acknowledgment 814, AP 802 may not receive the acknowledgment and time synchronization can be disrupted. In some examples, a leader device and/or follower device may detect such an attack (or non-malicious interference) based on an observed degradation (increase of clock compensation applied to network devices to synchronize with leader clock) in the overall clock synchronization performance.

Figure 8B:
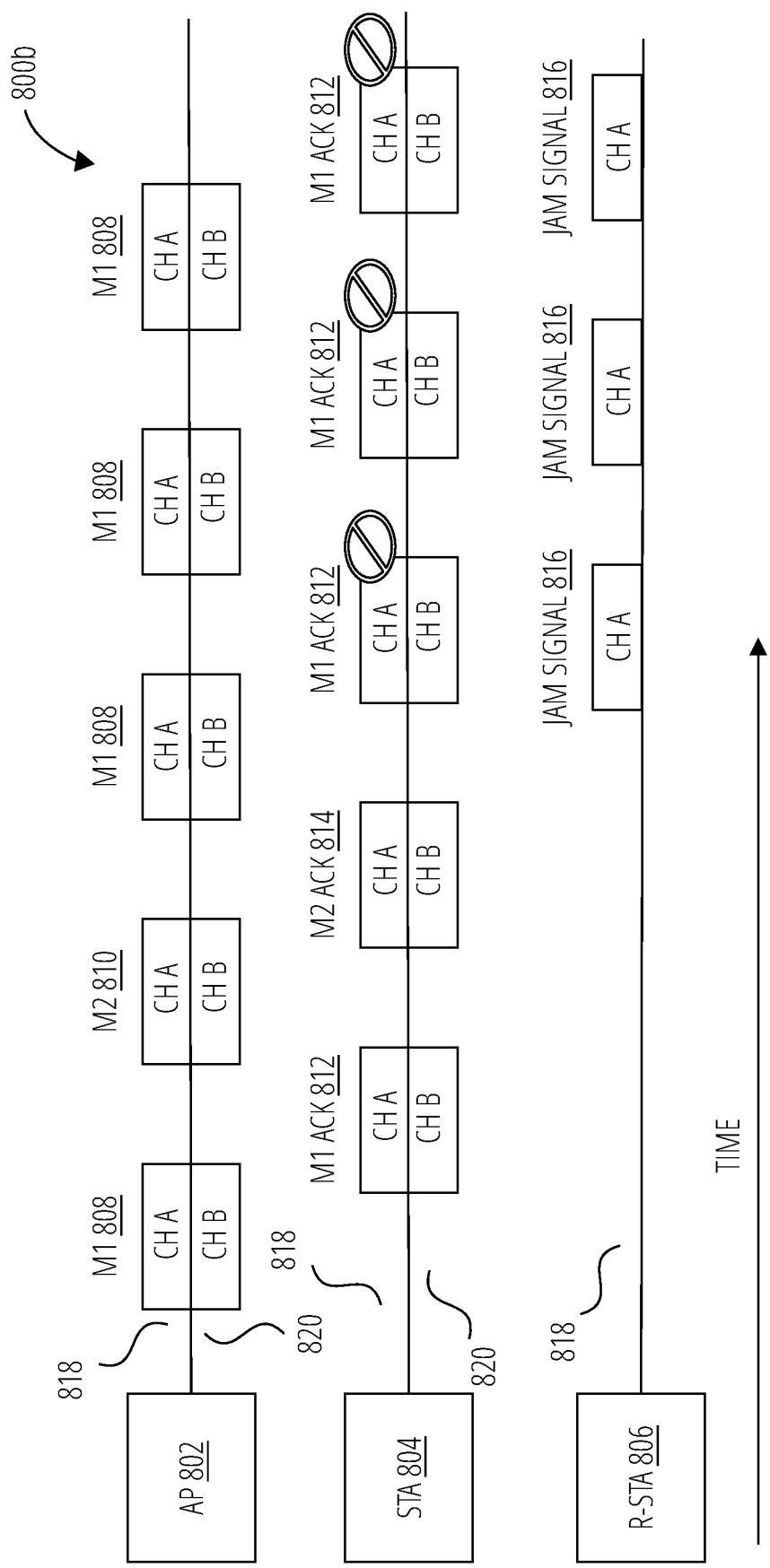
FIG. 8B illustrates a time synchronization sequence 800b.

FIG. 8B details time synchronization sequence 800b that illustrates mitigation of the interference depicted in FIG. 8A based on initiating multiple instances of time synchronization as described above. As noted above, a follower device (e.g., STA 804) can initiate multiple instances of time synchronization. In time synchronization sequence 800b, STA 804 can initiate time synchronization over channel A 818 and channel B 820 of a wireless network (e.g., any of the available channels on Wi-Fi, across different frequency bands such as 2.4 G Hz, 5 G Hz, or the like). Thus, during operation, messages and message acknowledgement frames are exchanged between the AP 802 and the STA 804 on each channel. That is, each instance of time synchronization is independent from the other. For example, time synchronization sequence 800b depicts message 1 808 and message 2 810 being transmitted by AP 802 on both channel A 818 and channel B 820. Likewise message 1 acknowledgment 812 and message 2 acknowledgment 814 are depicted being transmitted by STA 804 on both channel A 818 and channel B 820. However, in addition, time synchronization sequence 800b depicts R-STA 806 selectively jamming the wireless transmission of the message acknowledgement frames (e.g., message 1 acknowledgment 812). However, in this example, R-STA 806 is a single channel station and thus, only jams message acknowledgement frames on one channel, such as channel A 818. Accordingly, degradation of the time synchronization can be mitigated as time synchronization over channel B 820 may proceed unimpeded.

Figure 9:
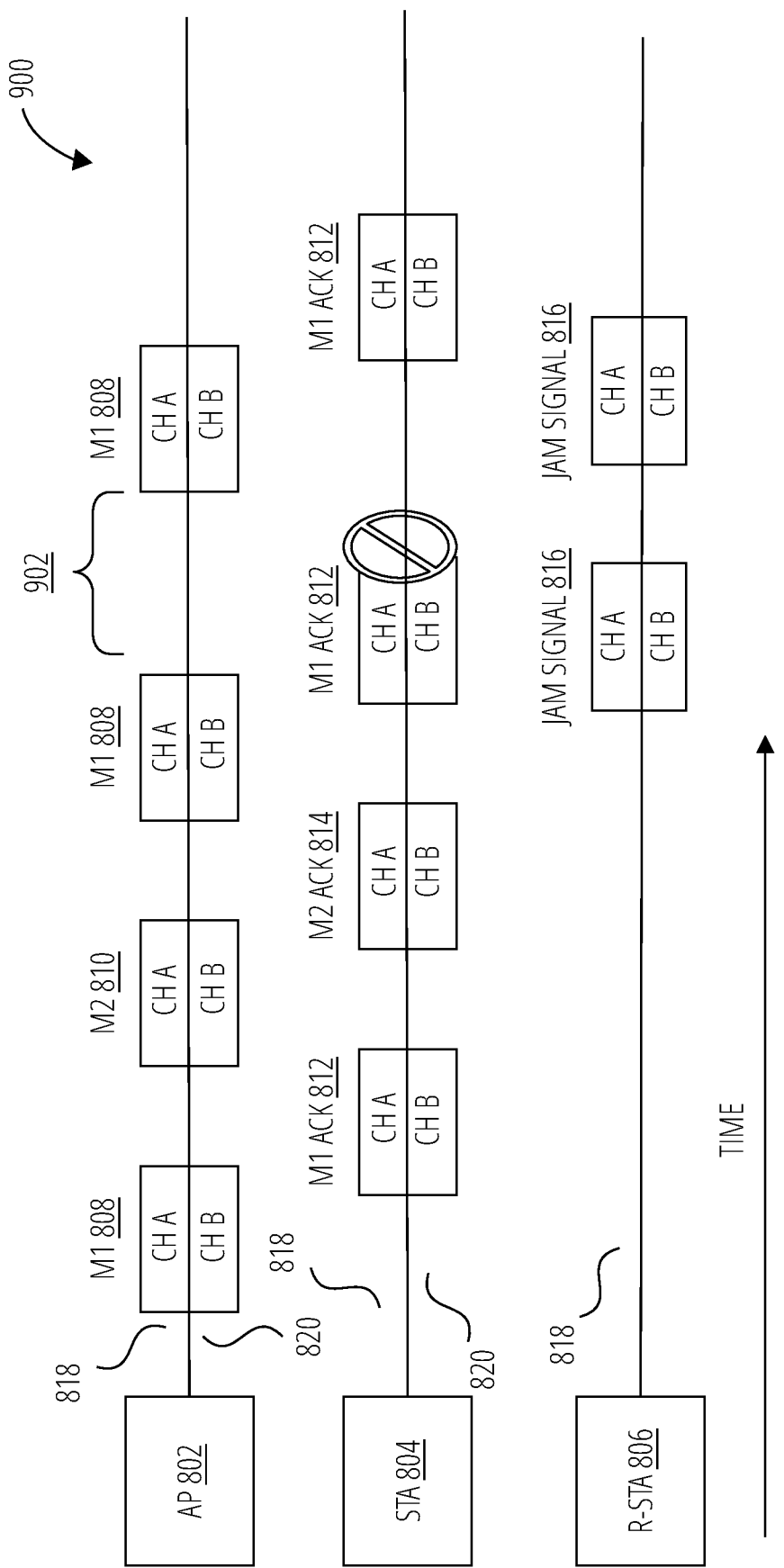
FIG. 9 illustrates a time synchronization sequence 900.

FIG. 9 details time synchronization sequence 900 that illustrates mitigation of the interference depicted in FIG. 8A based on randomizing the transmissions of action frames. As such, traffic pattern associated with the execution of the time synchronization instance (or instances as is depicted in this figure) are eliminated. Thus, malicious actors may have an increased difficulty predicting the timing of acknowledgement frames to jam may be decreased. As can be seen from time synchronization sequence 900, there is a break 902 in the periodicity of transmission of the message 1 808. In some examples, break 902 can be random. In other examples, break 902 can be based on a cryptographic random algorithm, such as, a cryptographically secure pseudorandom number generator (CSPRNG), or the like.

In some examples, a leader device (e.g., AP 802) can cause a break 902 between message frames based on not receiving an acknowledgment frame from a follower device (e.g., STA 804). In other examples, a leader device (e.g., AP 802) can cause a break 902 between message frames based on observing a degradation in timing synchronization as discussed above.

Figure 10:
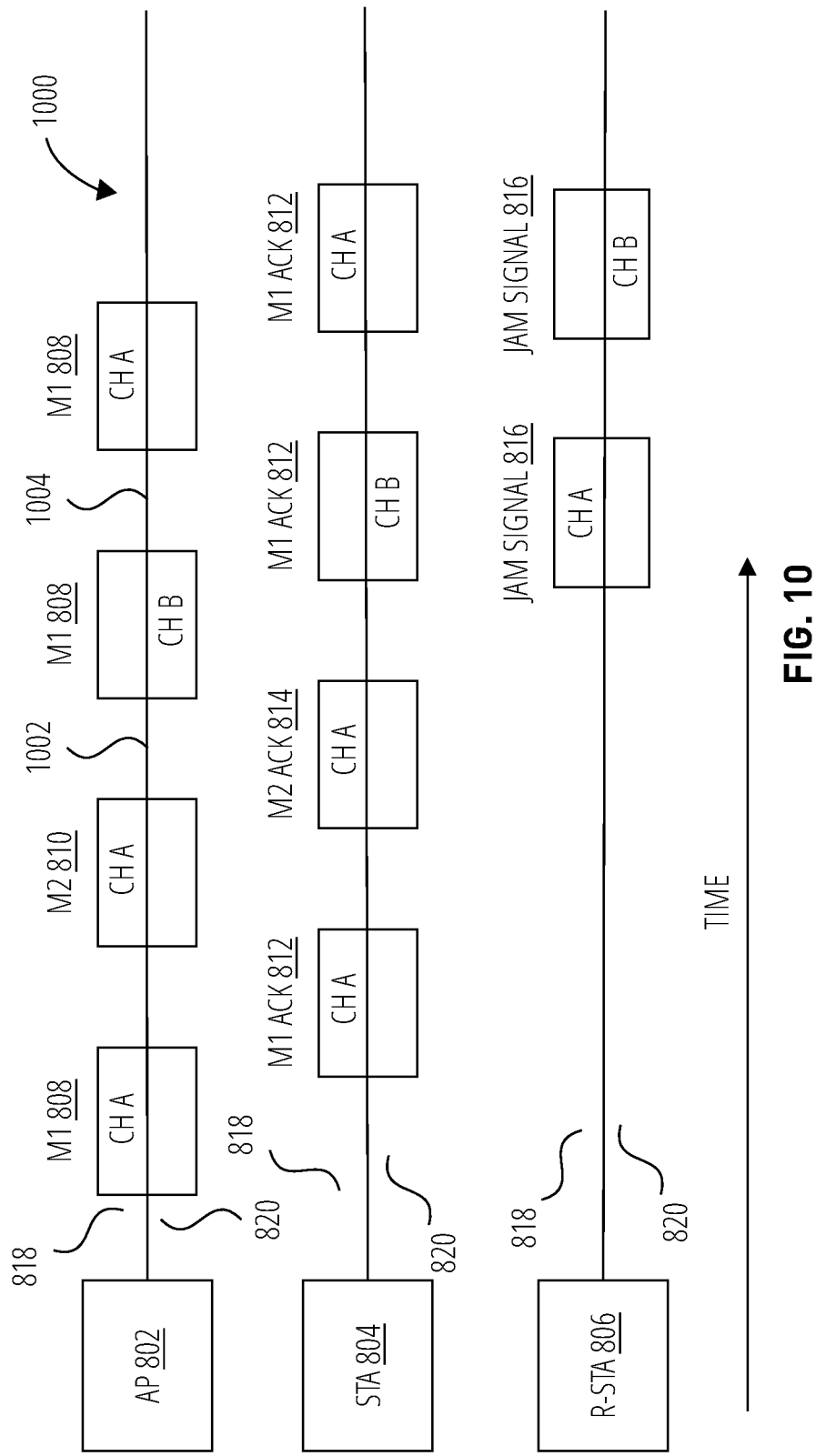
FIG. 10 illustrates a time synchronization sequence 1000.

FIG. 10 details time synchronization sequence 1000 that illustrates mitigation of the interference depicted in FIG. 8A based on channel hopping. As such, traffic pattern associated with the execution of the time synchronization instance (or instances as is depicted in this figure) are eliminated. Thus, malicious actors may have an increased difficulty predicting the timing of acknowledgement frames to jam may be decreased. More specifically, as discussed above, a rogue device (e.g., R-STA 806) can extract traffic patterns associated with the periodic packet exchange of time synchronization. However, when channel hopping (e.g., between dual links of a connection, or the like) periodicity of packet exchange in a single link can be obfuscated.

As can be seen from time synchronization sequence 1000, AP 802 implements a channel hop 1002 to switch from channel A 818 to channel B 820 and another channel hop 1004 to switch from channel B 820 to channel A 818. In some examples, the frequency of channel hopping can be based on a randomized sequence, or based on randomly selecting from an allowed number of consecutive packet exchanges (e.g., 2, 3, 4, 5, etc.).

Figure 11:
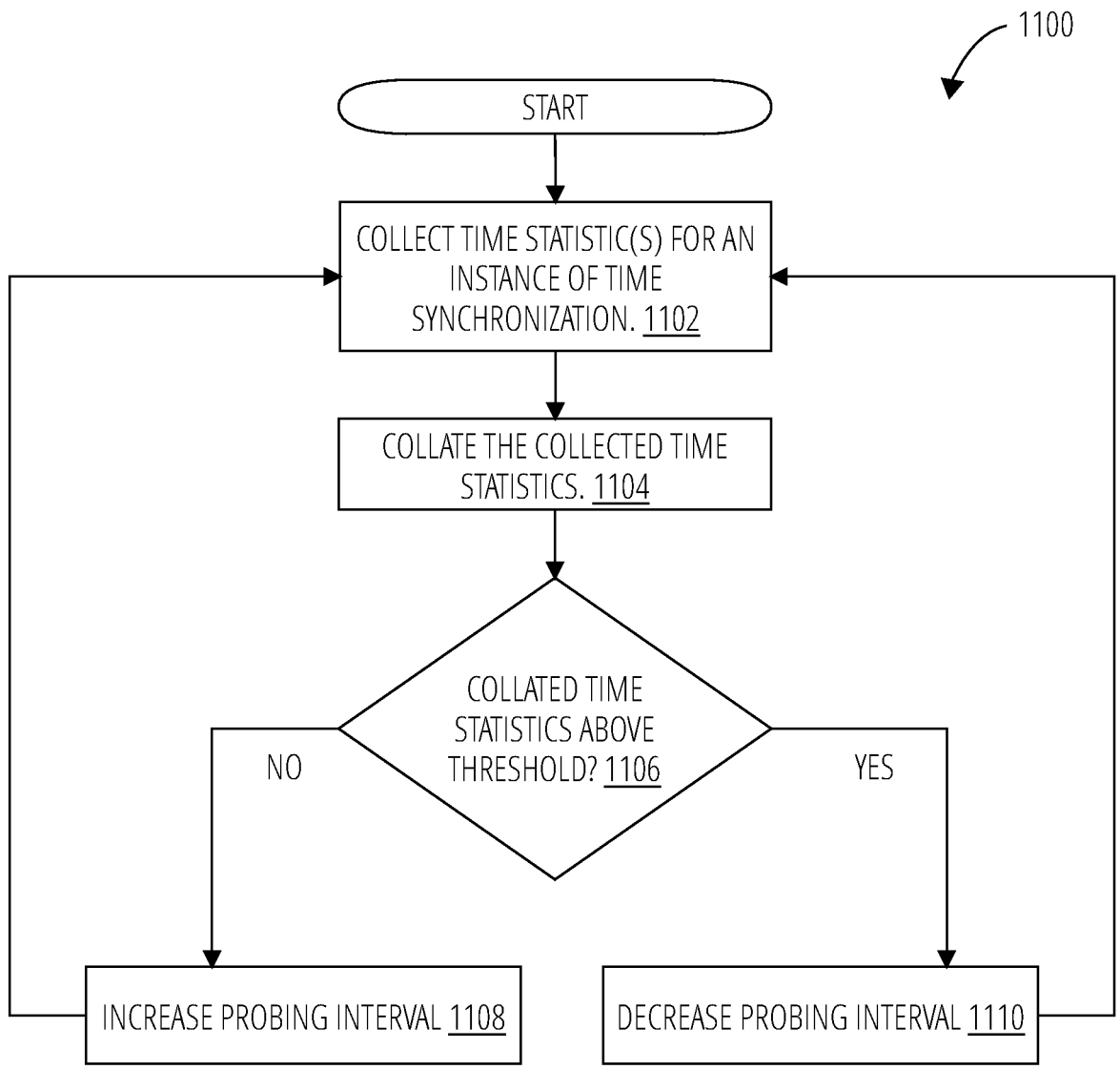
FIG. 11 illustrates a logic flow 1100.

FIG. 11 depicts logic flow 1100 for dynamically adjust packet exchange intervals, or probing intervals, for an instance of time synchronization. Logic flow 1100 can begin at block 1102. At block 1102 "collect time statistic(s) for an instance of time synchronization" circuitry of the client device can collect time statistic(s) for an instance of time synchronization. For example, processor circuit 402 can execute instructions 412 to collect time stamps from messages of a time synchronization packet exchange to form time statistics (e.g., timing statistics 416, or the like). For example, processor circuit 402 can execute instructions 412 to collect the time stamps (e.g., time 1 716, time 5 734 less time 1 716, etc) for an instance of time synchronization.

With some examples, logic flow 1100 can include initiating the time synchronization instance with channel probing interval (Tas) set to a default interval (e.g., 120 milliseconds, or the like).

Continuing to block 1104 "collate the collected time statistics" processing circuitry can collate the collected time statistics. For example, processor circuit 402 can execute instructions 412 to collate the time statistics collected at block 604 from the instance of time synchronization. As a specific example, processor circuit 402 can execute instructions 412 to derive the mean of the clock drift (e.g., $\overline{\tau d}$=mean($\tau d$)) corresponding to the time synchronization instance.

Continuing to decision block 1106 "collated time statistics above threshold?" processing circuitry can determine whether the collated time statistics are above a threshold level. For example, processor circuit 402 can execute instructions 412 to determine whether the collated time timing statistics 416 are above a threshold level. As a specific example, processor circuit 402 can execute instructions 412 to determine whether the mean of the clock drift is above a mean clock drift threshold (e.g., $\overline{\tau d}>\tau th$?). From decision block 1106, logic flow 1100 can proceed to either block 1108 or block 1110. In particular, logic flow 1100 can proceed from decision block 1106 to block 1108 based on a determination at decision block 1106 that the collated time statistics are not above the threshold (e.g., $\overline{\tau d} \leq \tau th$, or the like) while logic flow 1100 can proceed from decision block 1106 to block 1110 based on a determination at decision block 1106 that the collated time statistics are above the threshold (e.g., $\overline{\tau d}>\tau th$, or the like).

At block 1108 "increase the probing interval" processing circuitry can increase the probing interval. For example, processor circuit 402 in executing instructions 412 can increase the interval with which time synchronization packet exchange occurs. For example, processing circuitry can increase the probing interval Tas by a fixed amount (e.g., fixed time period, scaling factor, or the like). In some examples, the probing interval may be capped at the upper amount by a specific level (e.g., 1 second, or the like).

At block 1110 "decrease the probing interval" processing circuitry can decrease the probing interval. For example, processor circuit 402 in executing instructions 412 can decrease the interval with which time synchronization packet exchange occurs. For example, processing circuitry can decrease the probing interval Tas by a fixed amount (e.g., fixed time period, scaling factor, or the like). In some examples, the probing interval may be capped at the lower amount by a specific level (e.g., 1 millisecond, or the like).

With some examples, blocks block 1110 could be modified such that the probing interval is set based on a random ratio of an allowed probing interval. For example, processor circuit 402 can execute instructions 412 to set probing interval Tas=rand(1)Tr, where Tr is the maximum periodicity at which the channel is probed for synchronization. It is noted that rand(1) is a random sample extracted from uniform random distribution between 0 and 1.

Figure 12:
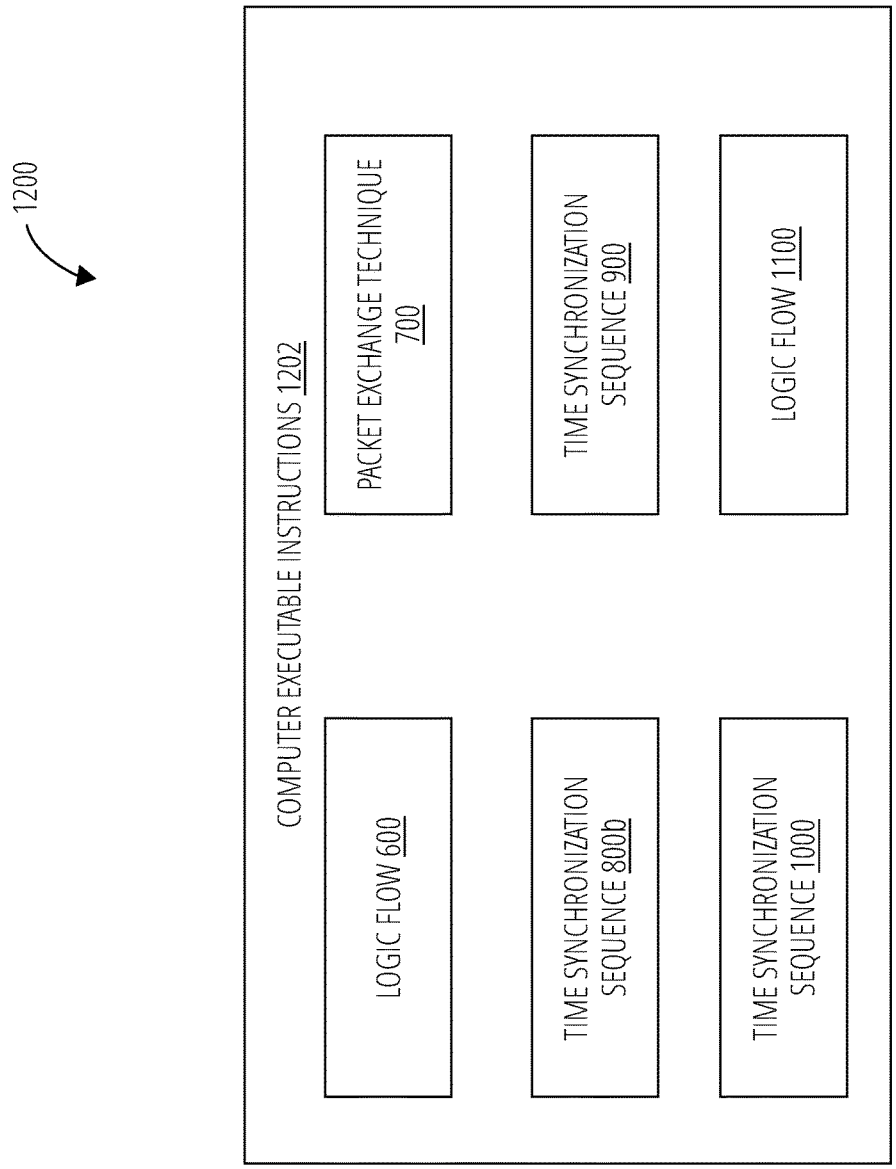
FIG. 12 illustrates a computer-readable storage medium 1200.

FIG. 12 illustrates computer-readable storage medium 1200. Computer-readable storage medium 1200 may comprise any non-transitory computer-readable storage medium or machine-readable storage medium, such as an optical, magnetic or semiconductor storage medium. In various embodiments, computer-readable storage medium 1200 may comprise an article of manufacture. In some embodiments, computer-readable storage medium 1200 may store computer executable instructions 1202 with which circuitry (e.g., processor circuit 402, processor circuit 502, radio circuitry 408, radio circuitry 508, or the like) can execute. For example, computer executable instructions 1202 can include instructions to implement operations described with respect to logic flow 600, packet exchange technique 700, time synchronization sequence 800*b*, time synchronization sequence 900, time synchronization sequence 1000, and/or logic flow 1100. Examples of computer-readable storage medium 1200 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 1202 may include any suitable type of code, such as source code, compiled code, interpreted code, executable code, static code, dynamic code, object-oriented code, visual code, and the like.

Figure 13:
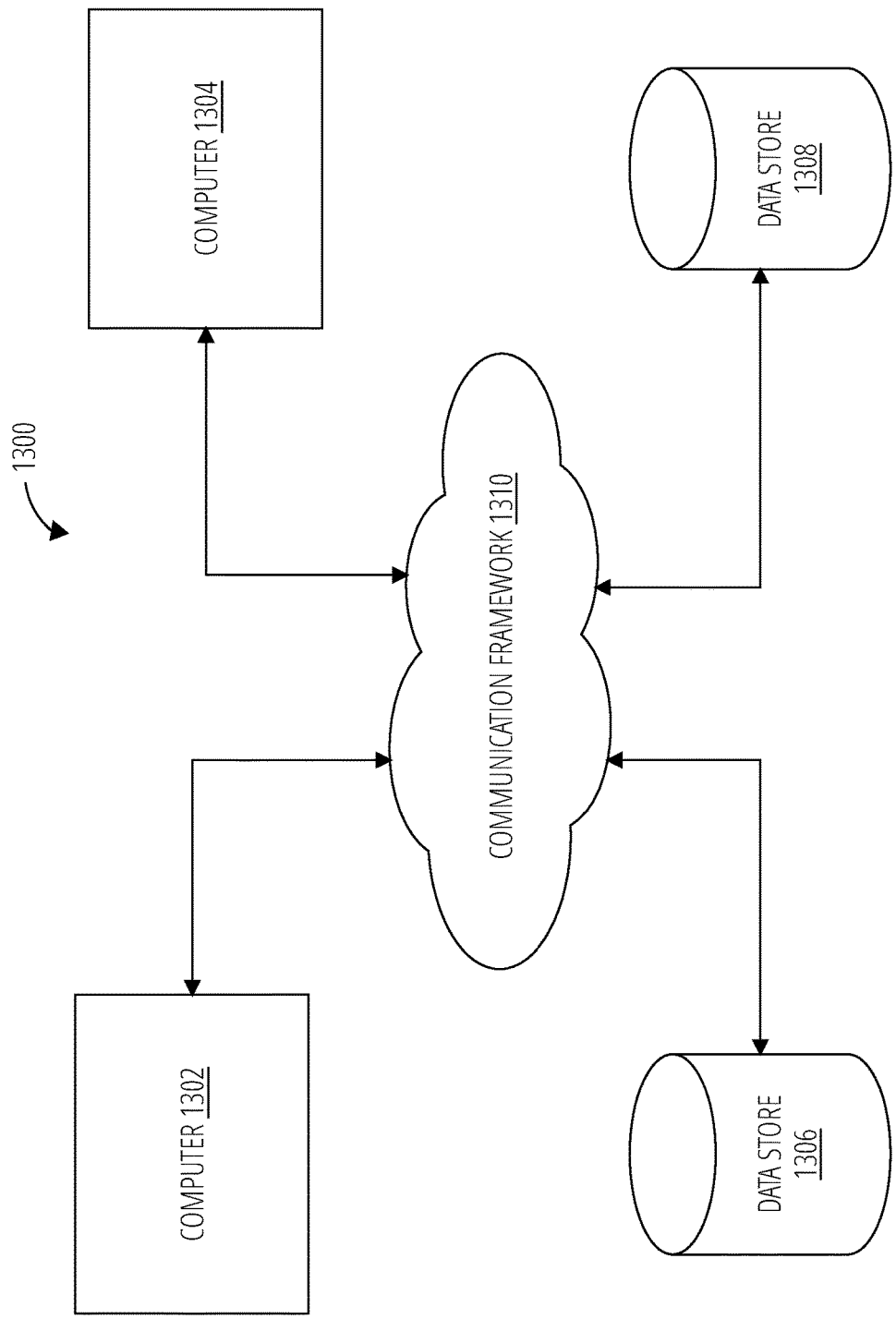
FIG. 13 illustrates a communication architecture 1300.

FIG. 13 illustrates an exemplary communication architecture 1300 suitable for implementing various embodiments. For example, one or more computing devices may communicate with each other via a communication framework 1310, which may be a network implemented to facilitate electronic communication between devices. The communication architecture 1300 includes various common communications elements, such as a transmitter, receiver, transceiver, radio, network interface, baseband processor, antenna, amplifiers, filters, power supplies, and so forth. The embodiments, however, are not limited to implementation by the communication architecture 1300.

As shown in this figure, the communication architecture 1300 includes a computer 1302 and a computer 1304, which are operatively connected to one or more respective data stores, such as, data store 1306 and/or data store 1308. Data store 1306 and data store 1308 can be employed to store information local to the respective computers (e.g., computer 1302, computer 1304, etc.), such as cookies and/or associated contextual information.

Computer 1302 and computer 1304 may communicate information between each other using a communication framework 1310. Computer 1302 and computer 1304 may provide time synchronization as part of communicating information between each other using communication framework 1310. In one example, computer 1302 may be implemented or configured in an RSU, and further, computer 1304 may be implemented or configured in a vehicle. The communication framework 1310 may implement any well-known communications techniques and protocols. The communication framework 1310 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1310 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by computer 1302 and computer 1304. Communication framework 1310 may be any one or combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 14:
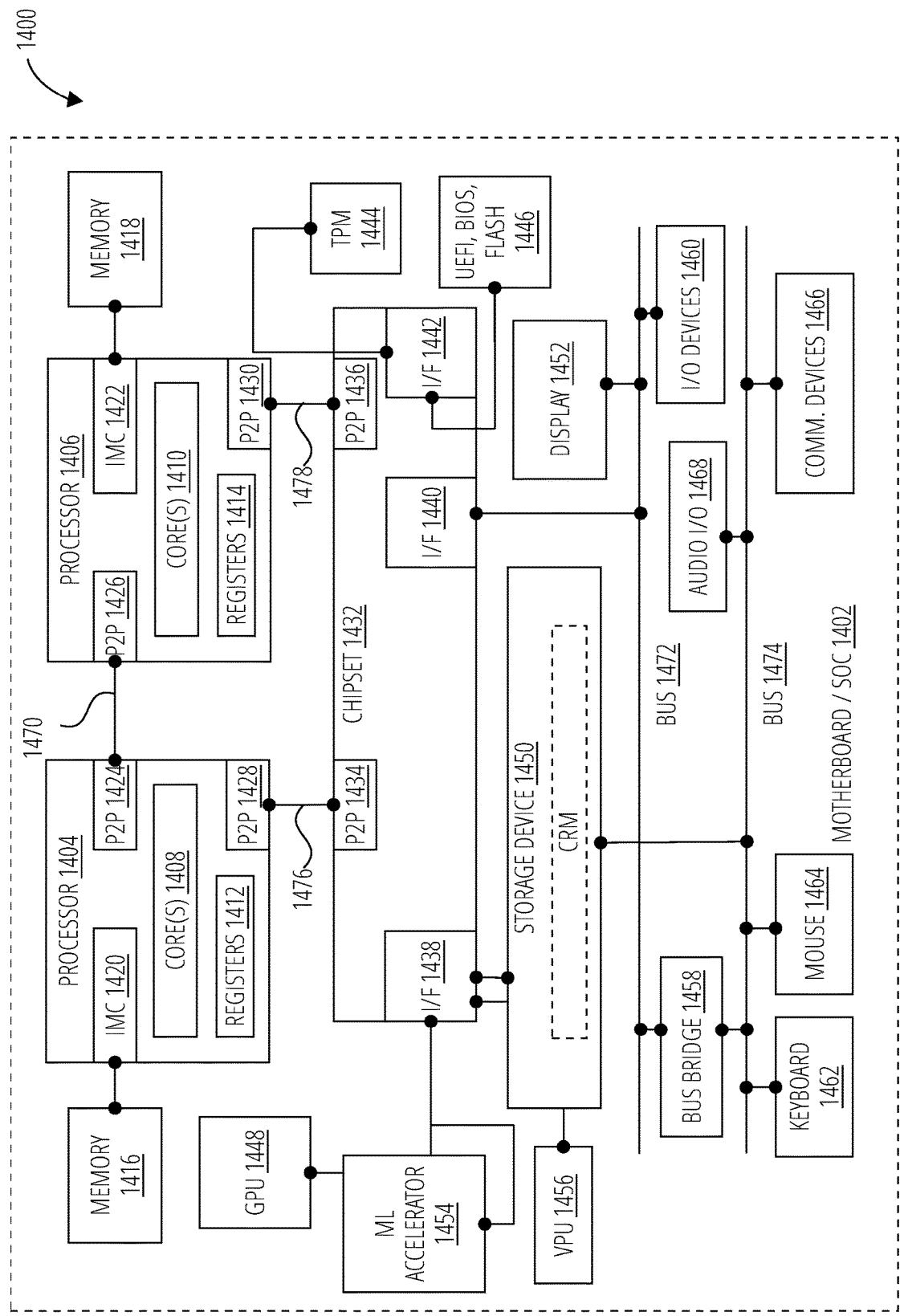
FIG. 14 illustrates a system 1400.

FIG. 14 illustrates an embodiment of a system 1400. System 1400 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 1400 may have a single processor with one core or more than one processor. Note that the term "processor" refers to a processor with a single core or a processor package with multiple processor cores. In at least one embodiment, the computing system 1400 is representative of the components of the vehicles or roadside unit of system 100 of FIG. 1, the stations and access points of environment 300 of FIG. 3, follower device 400, leader device 500, or the like. More generally, the computing system 1400 is configured to implement all logic, systems, logic flows, methods, apparatuses, and functionality described herein with reference to FIG. 1 to FIG. 13.

As used in this application, the terms "system" and "component" and "module" are intended to refer to a computer-related entity, either hardware, a combination of hardware and software, software, or software in execution, examples of which are provided by the exemplary system 1400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 1400 comprises a motherboard or system-on-chip (SoC) 1402 for mounting platform components. Motherboard or system-on-chip (SoC) 1402 is a point-to-point (P2P) interconnect platform that includes a first processor 1404 and a second processor 1406 coupled via a point-to-point interconnect 1470 such as an Ultra Path Interconnect (UPI). In other embodiments, the system 1400 may be of another bus architecture, such as a multi-drop bus. Furthermore, each of processor 1404 and processor 1406 may be processor packages with multiple processor cores including core(s) 1408 and core(s) 1410, respectively. While the system 1400 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 1404 and chipset 1432. Some platforms may include additional components and some platforms may only include sockets to mount the processors and/or the chipset. Furthermore, some platforms may not have sockets (e.g. SoC, or the like).

The processor 1404 and processor 1406 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi processor architectures may also be employed as the processor 1404 and/or processor 1406. Additionally, the processor 1404 need not be identical to processor 1406.

Processor 1404 includes registers 1412, integrated memory controller (IMC) 1420, and point-to-point (P2P) interface 1424 and P2P interface 1428. Similarly, the processor 1406 includes registers 1414, IMC 1422, as well as P2P interface 1426 and P2P interface 1430. IMC 1420 and IMC 1422 couple the processors processor 1404 and processor 1406, respectively, to respective memories (e.g., memory 1416 and memory 1418). Memory 1416 and memory 1418 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 1416 and memory 1418 locally attach to the respective processors (i.e., processor 1404 and processor 1406). In other embodiments, the main memory may couple with the processors via a bus and shared memory hub.

System 1400 includes chipset 1432 coupled to processor 1404 and processor 1406. Furthermore, chipset 1432 can be coupled to storage device 1450, for example, via an interface (I/F) 1438. The I/F 1438 may be, for example, a Peripheral Component Interconnect-enhanced (PCI-e). Storage device 1450 can store instructions executable by circuitry of system 1400 (e.g., processor 1404, processor 1406, GPU 1448, ML accelerator 1454, vision processing unit 1456, or the like). For example, storage device 1450 can store instructions for computer-readable storage medium 1200, or the like.

Processor 1404 couples to a chipset 1432 via P2P interface 1428 and P2P 1434 while processor 1406 couples to a chipset 1432 via P2P interface 1430 and P2P 1436. Direct media interface (DMI) 1476 and DMI 1478 may couple the P2P interface 1428 and the P2P 1434 and the P2P interface 1430 and P2P 1436, respectively. DMI 1476 and DMI 1478 may be a high-speed interconnect that facilitates, e.g., eight Giga Transfers per second (GT/s) such as DMI 3.0. In other embodiments, the processor 1404 and processor 1406 may interconnect via a bus.

The chipset 1432 may comprise a controller hub such as a platform controller hub (PCH). The chipset 1432 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 1432 may comprise more than one controller hub such as a chipset with a memory controller hub, a graphics controller hub, and an input/output (I/O) controller hub.

In the depicted example, chipset 1432 couples with a trusted platform module (TPM) 1444 and UEFI, BIOS, FLASH circuitry 1446 via I/F 1442. The TPM 1444 is a dedicated microcontroller designed to secure hardware by integrating cryptographic keys into devices. The UEFI, BIOS, FLASH circuitry 1446 may provide pre-boot code.

Furthermore, chipset 1432 includes the I/F 1438 to couple chipset 1432 with a high-performance graphics engine, such as, graphics processing circuitry or a graphics processing unit (GPU) 1448. In other embodiments, the system 1400 may include a flexible display interface (FDI) (not shown) between the processor 1404 and/or the processor 1406 and the chipset 1432. The FDI interconnects a graphics processor core in one or more of processor 1404 and/or processor 1406 with the chipset 1432.

Additionally, ML accelerator 1454 and/or vision processing unit 1456 can be coupled to chipset 1432 via I/F 1438. ML accelerator 1454 can be circuitry arranged to execute ML related operations (e.g., training, inference, etc.) for ML models. Likewise, vision processing unit 1456 can be circuitry arranged to execute vision processing specific or related operations. In particular, ML accelerator 1454 and/or vision processing unit 1456 can be arranged to execute mathematical operations and/or operands useful for machine learning, neural network processing, artificial intelligence, vision processing, etc.

Various I/O devices 1460 and display 1452 couple to the bus 1472, along with a bus bridge 1458 which couples the bus 1472 to a second bus 1474 and an I/F 1440 that connects the bus 1472 with the chipset 1432. In one embodiment, the second bus 1474 may be a low pin count (LPC) bus. Various devices may couple to the second bus 1474 including, for example, a keyboard 1462, a mouse 1464 and communication devices 1466.

Furthermore, an audio I/O 1468 may couple to second bus 1474. Many of the I/O devices 1460 and communication devices 1466 may reside on the motherboard or system-on-chip (SoC) 1402 while the keyboard 1462 and the mouse 1464 may be add-on peripherals. In other embodiments, some or all the I/O devices 1460 and communication devices 1466 are add-on peripherals and do not reside on the motherboard or system-on-chip (SoC) 1402.

The following examples pertain to further embodiments, from which numerous permutations and configurations will be apparent.

Example 1

A method, comprising: collecting, by circuitry at a follower device, time statistics for a first instance of wireless time synchronization between the follower device and a leader device; collecting, by the circuitry at the follower device, time statistics for a second instance of wireless time synchronization between the follower device and the leader device; collating, by the circuitry at the follower device, the time statistics for the first instance of wireless time synchronization and the second instance of wireless time synchronization; and disciplining, by the circuitry at the follower device, an internal clock of the follower device based on the collated time statistics.

Example 2

The method of example 1, comprising: establishing, between the follower device and the leader device, the first instances of wireless time synchronization; and establishing, between the follower device and the leader device, the second instance of wireless time synchronization.

Example 3

The method of example 2, comprising: sending, by the circuitry at the follower device, a first request to the leader device comprising indications to establish the first instance of wireless time synchronization; and sending, by the circuitry at the follower device, a second request to the leader device comprising indications to establish the second instance of wireless time synchronization.

Example 4

The method of example 3, wherein the first request comprises an indication to establish the first instance of wireless time synchronization on a first channel of a wireless network and wherein the second request comprises an indication to establish the second instance of wireless time synchronization on a second channel of the wireless network different from the first channel of the wireless network.

Example 5

The method of example 3, wherein the first instance of wireless time synchronization and the second instance of wireless time synchronization are established based on the Institute of Electrical and Electronics Engineers (IEEE) 802.1AS or 802.1Qbv standards.

Example 6

The method of example 1, collecting, by the circuitry at the follower device, time statistics for the first instance of wireless time synchronization between the follower device and the leader device comprising: receiving, by the circuitry at the follower device, a first message from the leader device, the first message comprising an indication of a first time stamp; sending, by the circuitry at the follower device, a first message acknowledgement to the leader device, the first message acknowledgement comprising an indication of a second time stamp; receiving, by the circuitry at the follower device, a second message from the leader device, the second message comprising an indication of a third time stamp and a first time differential; and sending, by the circuitry at the follower device, a second message acknowledgement to the leader device, the second message acknowledgement comprising an indication of a fourth time stamp, wherein the time statistics for the first instance of wireless time synchronization between the follower device and the leader device are based on the first time stamp, the second time stamp, the third times stamp, the fourth time stamp, and the first time differential.

Example 7

The method of example 6, wherein the first time differential comprises a difference between the first time stamp and a time at which the leader device received the first message acknowledgement.

Example 8

The method of example 6, collating, by the circuitry at the follower device, the time statistics for the first instance of wireless time synchronization and the second instance of wireless time synchronization comprises deriving, by the circuitry at the follower device, a mean drift of the first time stamp, the second time stamp, the third times stamp, the fourth time stamp, and the first time differential.

Example 9

The method of example 8, disciplining, by the circuitry at the follower device, an internal clock of the follower device based on the collated time statistics comprising disciplining the internal clock based on a lower of the mean drift of the first instance of wireless time synchronization or the mean drift of the second instance of wireless time synchronization.

Example 10

An apparatus, comprising means arranged to implement the function of any one of examples 1 to 9.

Example 11

At least one non-transitory computer-readable storage medium comprising instructions that when executed by a computing device, cause the computing device to perform the method of any one of examples 1 to 9.

Example 12

A computing apparatus comprising: circuitry at a follower device; and a memory device at the follower device, the memory storing instructions that, when executed by the circuitry, configure the apparatus to: collect time statistics for a first instance of wireless time synchronization between the follower device and a leader device; collect time statistics for a second instance of wireless time synchronization between the follower device and the leader device; collate the time statistics for the first instance of wireless time synchronization and the second instance of wireless time synchronization; and discipline an internal clock of the follower device based on the collated time statistics.

Example 13

The computing apparatus of example 12, the memory device storing instructions that, when executed by the circuitry, configure the apparatus to: establish the first instances of wireless time synchronization; and establish the second instance of wireless time synchronization.

Example 14

The computing apparatus of example 13, the memory device storing instructions that, when executed by the circuitry, configure the apparatus to: send a first request to the leader device comprising indications to establish the first instance of wireless time synchronization; and send a second request to the leader device comprising indications to establish the second instance of wireless time synchronization.

Example 15

The computing apparatus of example 14, wherein the first request comprises an indication to establish the first instance of wireless time synchronization on a first channel of a wireless network and wherein the second request comprises an indication to establish the second instance of wireless time synchronization on a second channel of the wireless network different from the first channel of the wireless network.

Example 16

The computing apparatus of example 14, wherein the first instance of wireless time synchronization and the second instance of wireless time synchronization are established based on the Institute of Electrical and Electronics Engineers (IEEE) 802.1AS or 802.1Qbv standards.

Example 17

The computing apparatus of example 12, the memory device storing instructions that, when executed by the circuitry, configure the apparatus to: receive a first message from the leader device, the first message comprising an indication of a first time stamp; send a first message acknowledgement to the leader device, the first message acknowledgement comprising an indication of a second time stamp; receive a second message from the leader device, the second message comprising an indication of a third time stamp and a first time differential; and send a second message acknowledgement to the leader device, the second message acknowledgement comprising an indication of a fourth time stamp, wherein the time statistics for the first instance of wireless time synchronization between the follower device and the leader device are based on the first time stamp, the second time stamp, the third times stamp, the fourth time stamp, and the first time differential.

Example 18

The computing apparatus of example 17, wherein the first time differential comprises a difference between the first time stamp and a time at which the leader device received the first message acknowledgement.

Example 19

The computing apparatus of example 17, the memory device storing instructions that, when executed by the circuitry, configure the apparatus to derive, by the circuitry at the follower device, a mean drift of the first time stamp, the second time stamp, the third times stamp, the fourth time stamp, and the first time differential.

Example 20

The computing apparatus of example 19, the memory device storing instructions that, when executed by the circuitry, configure the apparatus to discipline the internal clock based on a lower of the mean drift of the first instance of wireless time synchronization or the mean drift of the second instance of wireless time synchronization.

Example 21

A non-transitory computer-readable storage medium, the computer-readable storage medium including instructions that when executed by a computer, cause the computer to: collect, by circuitry at a follower device, time statistics for a first instance of wireless time synchronization between the follower device and a leader device; collect, by the circuitry at the follower device, time statistics for a second instance of wireless time synchronization between the follower device and the leader device; collate, by the circuitry at the follower device, the time statistics for the first instance of wireless time synchronization and the second instance of wireless time synchronization; and discipline, by the circuitry at the follower device, an internal clock of the follower device based on the collated time statistics.

Example 22

The computer-readable storage medium of example 21, comprising: establish, between the follower device and the leader device, the first instances of wireless time synchronization; and establish, between the follower device and the leader device, the second instance of wireless time synchronization.

Example 23

The computer-readable storage medium of example 22, comprising: send, by the circuitry at the follower device, a first request to the leader device comprising indications to establish the first instance of wireless time synchronization; and send, by the circuitry at the follower device, a request to the leader device comprising indications to establish the first instance of wireless time synchronization on a first channel, different than the first channel, of a wireless network.

Example 24

The computer-readable storage medium of example 23, wherein the first request comprises an indication to establish the first instance of wireless time synchronization on a first channel of a wireless network and wherein the second request comprises an indication to establish the second instance of wireless time synchronization on a second channel of the wireless network different from the first channel of the wireless network.

Example 25

The computer-readable storage medium of example 23, wherein the first instance of wireless time synchronization and the second instance of wireless time synchronization are established based on the Institute of Electrical and Electronics Engineers (IEEE) 802.1AS or 802.1Qbv standards.

Example 26

The computer-readable storage medium of example 21, collect, by the circuitry at the follower device, time statistics for the first instance of wireless time synchronization between the follower device and the leader device comprising: receive, by the circuitry at the follower device, a first message from the leader device, the first message comprising an indication of a first time stamp; send, by the circuitry at the follower device, a first message acknowledgement to the leader device, the first message acknowledgement comprising an indication of a second time stamp; receive, by the circuitry at the follower device, a second message from the leader device, the second message comprising an indication of a third time stamp and a first time differential; and send, by the circuitry at the follower device, a second message acknowledgement to the leader device, the second message acknowledgement comprising an indication of a fourth time stamp, wherein the time statistics for the first instance of wireless time synchronization between the follower device and the leader device are based on the first time stamp, the second time stamp, the third times stamp, the fourth time stamp, and the first time differential.

Example 27

The computer-readable storage medium of example 26, wherein the first time differential comprises a difference between the first time stamp and a time at which the leader device received the first message acknowledgement.

Example 28

The computer-readable storage medium of example 26, collate, by the circuitry at the follower device, the time statistics for the first instance of wireless time synchronization and the second instance of wireless time synchronization comprises deriving, by the circuitry at the follower device, a mean drift of the first time stamp, the second time stamp, the third times stamp, the fourth time stamp, and the first time differential.

Example 29

The computer-readable storage medium of example 28, discipline, by the circuitry at the follower device, an internal clock of the follower device based on the collated time statistics comprising disciplining the internal clock based on a lower of the mean drift of the first instance of wireless time synchronization or the mean drift of the second instance of wireless time synchronization.

Example 30

A system, comprising: a leader device comprising circuitry, a radio, and an antenna; and at least one follower device, comprising the apparatus of any one of examples 13 to 20.

What is claimed is:
1. A computing apparatus comprising:
circuitry at a follower device; and a memory device at the follower device, the memory storing instructions that, when executed by the circuitry, configure the apparatus to:

collect time statistics for a first instance of wireless time synchronization between the follower device and a leader device, the first instance of wireless time synchronization on a first channel of a wireless network;

collect time statistics for a second instance of wireless time synchronization between the follower device and the leader device, the second instance of wireless time synchronization on a second channel of the wireless network different from the first channel of the wireless network;

collate the time statistics for the first instance of wireless time synchronization and the second instance of wireless time synchronization;

detect a security attack based on the time statistics; and discipline an internal clock of the follower device based on the collated time statistics.

2. The computing apparatus of claim 1, the memory device storing instructions that, when executed by the circuitry, configure the apparatus to:

establish the first instances of wireless time synchronization; and establish the second instance of wireless time synchronization.

3. The computing apparatus of claim 1, the memory device storing instructions that, when executed by the circuitry, configure the apparatus to:

send a first request to the leader device comprising indications to establish the first instance of wireless time synchronization; and send a second request to the leader device comprising indications to establish the second instance of wireless time synchronization.

4. The computing apparatus of claim 3, wherein the first request comprises an indication to establish the first instance of wireless time synchronization on the first channel of the wireless network and wherein the second request comprises an indication to establish the second instance of wireless time synchronization on the second channel of the wireless network different from the first channel of the wireless network.

5. The computing apparatus of claim 3, wherein the first instance of wireless time synchronization and the second instance of wireless time synchronization are established based on the Institute of Electrical and Electronics Engineers (IEEE) 802.1AS or 802.1Qbv standards.

6. The computing apparatus of claim 1, the memory device storing instructions that, when executed by the circuitry, configure the apparatus to:

receive a first message from the leader device, the first message comprising an indication of a first time stamp;

send a first message acknowledgement to the leader device, the first message acknowledgement comprising an indication of a second time stamp;

receive a second message from the leader device, the second message comprising an indication of a third time stamp and a first time differential; and send a second message acknowledgement to the leader device, the second message acknowledgement comprising an indication of a fourth time stamp, wherein the time statistics for the first instance of wireless time synchronization between the follower device and the leader device are based on the first time stamp, the second time stamp, the third times stamp, the fourth time stamp, and the first time differential.

7. The computing apparatus of claim 6, wherein the first time differential comprises a difference between the first time stamp and a time at which the leader device received the first message acknowledgement.

8. The computing apparatus of claim 6, the memory device storing instructions that, when executed by the circuitry, configure the apparatus to derive, by the circuitry at the follower device, a mean drift of the first time stamp, the second time stamp, the third times stamp, the fourth time stamp, and the first time differential.

9. The computing apparatus of claim 8, the memory device storing instructions that, when executed by the circuitry, configure the apparatus to discipline the internal clock based on a lower of the mean drift of the first instance of wireless time synchronization or the mean drift of the second instance of wireless time synchronization.

10. A method, comprising:

collecting, by circuitry at a follower device, time statistics for a first instance of wireless time synchronization between the follower device and a leader device, the first instance of wireless time synchronization on a first channel of a wireless network;

collecting, by the circuitry at the follower device, time statistics for a second instance of wireless time synchronization between the follower device and the leader device, the second instance of wireless time synchronization on a second channel of the wireless network different from the first channel of the wireless network;

collating, by the circuitry at the follower device, the time statistics for the first instance of wireless time synchronization and the second instance of wireless time synchronization;

detect, by the circuitry at the follower device, a security attack based on the time statistics; and disciplining, by the circuitry at the follower device, an internal clock of the follower device based on the collated time statistics.

11. The method of claim 10, comprising:

establishing, between the follower device and the leader device, the first instances of wireless time synchronization; and establishing, between the follower device and the leader device, the second instance of wireless time synchronization.

12. The method of claim 11, comprising:

sending, by the circuitry at the follower device, a first request to the leader device comprising indications to establish the first instance of wireless time synchronization; and sending, by the circuitry at the follower device, a request to the leader device comprising indications to establish the first instance of wireless time synchronization on a first channel, different than the first channel, of a wireless network.

13. The method of claim 12, wherein the first request comprises an indication to establish the first instance of wireless time synchronization on the first channel of the wireless network and wherein the second request comprises an indication to establish the second instance of wireless time synchronization on the second channel of the wireless network different from the first channel of the wireless network.

14. The method of claim 12, wherein the first instance of wireless time synchronization and the second instance of wireless time synchronization are established based on the Institute of Electrical and Electronics Engineers (IEEE) 802.1AS or 802.1Qbv standards.

15. The method of claim 10, collecting, by the circuitry at the follower device, time statistics for the first instance of wireless time synchronization between the follower device and the leader device comprising:
  receiving, by the circuitry at the follower device, a first message from the leader device, the first message comprising an indication of a first time stamp;
  sending, by the circuitry at the follower device, a first message acknowledgement to the leader device, the first message acknowledgement comprising an indication of a second time stamp;
  receiving, by the circuitry at the follower device, a second message from the leader device, the second message comprising an indication of a third time stamp and a first time differential; and
  sending, by the circuitry at the follower device, a second message acknowledgement to the leader device, the second message acknowledgement comprising an indication of a fourth time stamp,
  wherein the time statistics for the first instance of wireless time synchronization between the follower device and the leader device are based on the first time stamp, the second time stamp, the third times stamp, the fourth time stamp, and the first time differential.

16. The method of claim 15, wherein the first time differential comprises a difference between the first time stamp and a time at which the leader device received the first message acknowledgement.

17. The method of claim 15, collating, by the circuitry at the follower device, the time statistics for the first instance of wireless time synchronization and the second instance of wireless time synchronization comprises deriving, by the circuitry at the follower device, a mean drift of the first time stamp, the second time stamp, the third times stamp, the fourth time stamp, and the first time differential.

18. The method of claim 17, disciplining, by the circuitry at the follower device, an internal clock of the follower device based on the collated time statistics comprising disciplining the internal clock based on a lower of the mean drift of the first instance of wireless time synchronization or the mean drift of the second instance of wireless time synchronization.

19. A non-transitory computer-readable storage medium, the computer-readable storage medium including instructions that when executed by a computer, cause the computer to:
  collect, by circuitry at a follower device, time statistics for a first instance of wireless time synchronization between the follower device and a leader device, the first instance of wireless time synchronization on a first channel of a wireless network;
  collect, by the circuitry at the follower device, time statistics for a second instance of wireless time synchronization between the follower device and the leader device, the second instance of wireless time synchronization on a second channel of the wireless network different from the first channel of the wireless network;
  collate, by the circuitry at the follower device, the time statistics for the first instance of wireless time synchronization and the second instance of wireless time synchronization;
  detect, by the circuitry at the follower device, a security attack based on the time statistics; and
  discipline, by the circuitry at the follower device, an internal clock of the follower device based on the collated time statistics.

20. The computer-readable storage medium of claim 19, comprising:
  establish, between the follower device and the leader device, the first instances of wireless time synchronization; and
  establish, between the follower device and the leader device, the second instance of wireless time synchronization.

21. The computer-readable storage medium of claim 20, comprising:
  send, by the circuitry at the follower device, a first request to the leader device comprising indications to establish the first instance of wireless time synchronization on the first channel of the wireless network; and
  send, by the circuitry at the follower device, a second request to the leader device comprising indications to establish the second instance of wireless time synchronization on the second channel, different than the first channel, of the wireless network.

22. The computer-readable storage medium of claim 19, collect, by the circuitry at the follower device, time statistics for the first instance of wireless time synchronization between the follower device and the leader device comprising:
  receive, by the circuitry at the follower device, a first message from the leader device, the first message comprising an indication of a first time stamp;
  send, by the circuitry at the follower device, a first message acknowledgement to the leader device, the first message acknowledgement comprising an indication of a second time stamp;
  receive, by the circuitry at the follower device, a second message from the leader device, the second message comprising an indication of a third time stamp and a first time differential; and
  send, by the circuitry at the follower device, a second message acknowledgement to the leader device, the second message acknowledgement comprising an indication of a fourth time stamp,
  wherein the time statistics for the first instance of wireless time synchronization between the follower device and the leader device are based on the first time stamp, the second time stamp, the third times stamp, the fourth time stamp, and the first time differential.

23. The computer-readable storage medium of claim 22, wherein the first time differential comprises a difference between the first time stamp and a time at which the leader device received the first message acknowledgement.

24. The computer-readable storage medium of claim 22, collate, by the circuitry at the follower device, the time statistics for the first instance of wireless time synchronization and the second instance of wireless time synchronization comprises deriving, by the circuitry at the follower device, a mean drift of the first time stamp, the second time stamp, the third times stamp, the fourth time stamp, and the first time differential.

25. The computer-readable storage medium of claim 24, discipline, by the circuitry at the follower device, an internal clock of the follower device based on the collated time statistics comprising disciplining the internal clock based on a lower of the mean drift of the first instance of wireless time synchronization or the mean drift of the second instance of wireless time synchronization.

\* \* \* \* \*